US010429167B2

(12) United States Patent
Nakagawa et al.

(10) Patent No.: US 10,429,167 B2
(45) Date of Patent: Oct. 1, 2019

(54) COORDINATE CORRECTION METHOD AND COORDINATE MEASURING MACHINE

(71) Applicant: MITUTOYO CORPORATION, Kanagawa (JP)

(72) Inventors: Hideyuki Nakagawa, Ibaraki (JP); Nobuhiro Ishikawa, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 156 days.

(21) Appl. No.: 15/682,904

(22) Filed: Aug. 22, 2017

(65) Prior Publication Data

US 2018/0058834 A1    Mar. 1, 2018

(30) Foreign Application Priority Data

Aug. 26, 2016  (JP) .................................. 2016-166345

(51) Int. Cl.
*G01B 5/008* (2006.01)
*G01B 5/012* (2006.01)
(Continued)

(52) U.S. Cl.
CPC .............. *G01B 5/012* (2013.01); *G01B 5/008* (2013.01); *G01B 7/012* (2013.01); *G01B 11/005* (2013.01);
(Continued)

(58) Field of Classification Search
CPC ..................................................... G01B 5/0016
(Continued)

(56) References Cited

U.S. PATENT DOCUMENTS 5,125,261 A    6/1992  Powley
6,909,983 B2   6/2005  Sutherland
(Continued)

FOREIGN PATENT DOCUMENTS

DE        4325602 C1      9/1994
DE    102011053117 A1     3/2012
(Continued)

OTHER PUBLICATIONS

Office Action issued in European Patent Office (EPO) family member Patent Appl. No. 17187937.2, dated Nov. 21, 2018.
(Continued)

*Primary Examiner* — George B Bennett
(74) *Attorney, Agent, or Firm* — Greenblum & Bernstein, P.L.C.

(57) ABSTRACT

As a former correction step, a coordinate correction method includes: a step of setting a measuring probe in a drive mechanism; a step of restraining a measurement tip; a step of acquiring a moving amount and a probe output; and a step of generating a former correction matrix including linear correction elements and non-linear correction elements. As a latter correction step, the coordinate correction method includes: a step of setting a measuring probe in a drive mechanism; a step of restraining a measurement tip; a step of acquiring a moving amount and a probe output; a step of generating an intermediate correction matrix including linear correction elements for correcting the probe output; and a step of correcting the probe output with a latter correction matrix. Consequently, correction can be simplified while allowing for correction of a non-linear error of the probe output supplied from the measuring probe.

13 Claims, 19 Drawing Sheets

(51) Int. Cl.
  *G01B 21/04* (2006.01)
  *G01B 7/012* (2006.01)
  *G01B 11/00* (2006.01)

(52) U.S. Cl.
  CPC ......... *G01B 21/042* (2013.01); *G01B 21/045* (2013.01); *G01B 21/047* (2013.01)

(58) Field of Classification Search
  USPC .................................................. 33/502, 503
  See application file for complete search history.

(56) References Cited

U.S. PATENT DOCUMENTS

| | | | |
|---|---|---|---|
| 7,131,207 B2 | 11/2006 | McFarland | |
| 7,353,616 B2 | 4/2008 | Matsumoto et al. | |
| 7,885,777 B2 | 2/2011 | Jonas et al. | |
| 7,900,367 B2 | 3/2011 | Sutherland | |
| 7,913,537 B2 | 3/2011 | Petterson | |
| 8,825,427 B2 | 9/2014 | Kunzmann et al. | |
| 8,983,795 B2 | 3/2015 | Lotze et al. | |
| 9,091,522 B2 | 7/2015 | Nakagawa et al. | |
| 9,097,504 B2 | 8/2015 | Ishikawa et al. | |
| 9,459,096 B2 | 10/2016 | Guasco | |
| 9,464,877 B2 | 10/2016 | Nakagawa et al. | |
| 9,683,839 B2 | 6/2017 | Nakagawa et al. | |
| 9,719,779 B2 | 8/2017 | Ishikawa et al. | |
| 9,746,303 B2 | 8/2017 | Nakagawa et al. | |
| 2008/0065341 A1* | 3/2008 | Ishikawa | G01B 21/045 702/95 |
| 2011/0161046 A1 | 6/2011 | Chang et al. | |
| 2014/0130362 A1* | 5/2014 | Ishikawa | G01B 21/045 33/503 |
| 2015/0176956 A1* | 6/2015 | Pettersson | G01B 21/04 33/503 |
| 2015/0241194 A1 | 8/2015 | Nakagawa et al. | |
| 2015/0300798 A1* | 10/2015 | Pettersson | G01B 21/04 33/503 |
| 2016/0153767 A1* | 6/2016 | Ihlenfeldt | G01B 11/005 33/503 |
| 2017/0234676 A1* | 8/2017 | Haverkamp | G01B 5/008 33/503 |
| 2017/0248400 A1 | 8/2017 | Koga et al. | |
| 2017/0248402 A1 | 8/2017 | Koga et al. | |

FOREIGN PATENT DOCUMENTS

| | | |
|---|---|---|
| EP | 2172735 A2 | 4/2010 |
| EP | 2543955 A1 | 1/2013 |
| EP | 2733460 A1 | 5/2014 |
| EP | 2910895 A1 | 8/2015 |
| JP | H02-284216 A | 11/1990 |
| JP | 2002-528709 A | 9/2002 |
| JP | 2004-108959 A | 4/2004 |
| JP | 2004-521343 A | 7/2004 |
| JP | 2005-181293 A | 7/2005 |
| JP | 2006-329795 A | 12/2006 |
| JP | 2007-183184 A | 7/2007 |
| JP | 2008-539408 A | 11/2008 |
| JP | 2009-516195 A | 4/2009 |
| JP | 2009-534681 A | 9/2009 |
| JP | 2010-145211 A | 7/2010 |
| JP | 2011-503628 A | 1/2011 |
| JP | 2013-015464 A | 1/2013 |
| JP | 5297787 B2 | 9/2013 |
| JP | 2015-158387 A | 9/2015 |
| JP | 2016-090434 A | 5/2016 |
| WO | 02/073128 A1 | 9/2002 |
| WO | 2004/051179 A1 | 6/2004 |
| WO | 2007/058610 A1 | 5/2007 |

OTHER PUBLICATIONS

Office Action issued in Japan family member Patent Appl. No. 2016-166343, dated Feb. 13, 2018, along with an English translation thereof.
Office Action issued in Japan family member Patent Appl. No. 2016-166344, dated Feb. 13, 2018, along with an English translation thereof.
U.S. Appl. No. 15/680,653 to Hideyuki Nakagawa et al., which was filed on Aug. 18, 2017.
U.S. Appl. No. 15/681,926 to Hideyuki Nakagawa et al., which was filed on Aug. 21, 2017.
Official Communication issued in European Patent Office (EPO) Patent Application No. 17187463.9, dated Jan. 3, 2018.
Official Communication issued in European Patent Office (EPO) Patent Application No. 17187937.2, dated Jan. 3, 2018.
Official Communication issued in European Patent Office (EPO) Patent Application No. 17187935.6, dated Jan. 16, 2018.
Notice of Reasons for Rejection issued in Japanese family member Patent Appl. No. 2016-166343, dated Mar. 28, 2019, along with an English translation thereof.

* cited by examiner

COORDINATE CORRECTION METHOD AND COORDINATE MEASURING MACHINE

CROSS-REFERENCE TO RELATED APPLICATION

The disclosure of Japanese Patent Application No. 2016-166345 filed on Aug. 26, 2016 including specifications, drawings and claims is incorporated herein by reference in its entirety.

TECHNICAL FIELD

The present invention relates to a coordinate correction method and a coordinate measuring machine, and more particularly, to a coordinate correction method and a coordinate measuring machine that can simplify correction immediately before measurement while allowing for correction of a non-linear error of a probe output supplied from a measuring probe.

BACKGROUND ART

A conventionally known coordinate measuring machine includes: a measuring probe having a stylus with a measurement tip (contact member) to be brought into contact with an object to be measured, and a probe body for movably supporting the stylus and providing a probe output according to a displacement of the measurement tip; a drive mechanism for holding and moving the measuring probe; and a processing device for computing shape coordinates of the object to be measured on the basis of the probe output and a moving amount of the measuring probe by the drive mechanism. This processing device can compute shape coordinates $\{x, y, z\}^T$ (referred to as "XX") shown in Formula (1) by adding a moving amount $\{x_m, y_m, z_m\}^T$ (referred to as "M") of the measuring probe by the drive mechanism in an machine coordinate system, which is a coordinate system of the coordinate measuring machine, and a probe output $\{x_p, y_p, z_p\}^T$ (referred to as "P") in a probe coordinate system, which is a coordinate system of the measuring probe.

$$\begin{Bmatrix} x \\ y \\ z \end{Bmatrix} = \begin{Bmatrix} x_m \\ y_m \\ z_m \end{Bmatrix} + \begin{Bmatrix} x_p \\ y_p \\ z_p \end{Bmatrix} \quad \text{Formula (1)}$$

To reduce errors resulting from discrepancy between the machine coordinate system and the probe coordinate system, Japanese Patent No. 5297787 (hereinafter, referred to as Patent Literature 1) has proposed a method in which the measuring probe is driven by the drive mechanism while a translational displacement of the measurement tip is restrained, and a correction matrix A is generated on the basis of the moving amount M and the probe output P of the measuring probe at each of a plurality of measurement points. With the obtained correction matrix A, the probe output P can be transformed into a transformed output $\{x_{p\_m}, y_{p\_m}, z_{p\_m}\}^T$ (referred to as "PM") in the machine coordinate system as shown in Formula (2). Thereafter, the shape coordinates XX can be computed by adding the moving amount M of the measuring probe and the transformed output PM as shown in Formula (3).

$$\begin{Bmatrix} x_{p\_m} \\ y_{p\_m} \\ z_{p\_m} \end{Bmatrix} = \begin{bmatrix} A_{11} & A_{12} & A_{13} \\ A_{21} & A_{22} & A_{23} \\ A_{31} & A_{32} & A_{33} \end{bmatrix} \begin{Bmatrix} x_p \\ y_p \\ z_p \end{Bmatrix} \quad \text{Formula (2)}$$

$$\begin{Bmatrix} x \\ y \\ z \end{Bmatrix} = \begin{Bmatrix} x_m \\ y_m \\ z_m \end{Bmatrix} + \begin{Bmatrix} x_{p\_m} \\ y_{p\_m} \\ z_{p\_m} \end{Bmatrix} \quad \text{Formula (3)}$$

Where $\begin{bmatrix} A_{11} & A_{12} & A_{13} \\ A_{21} & A_{22} & A_{23} \\ A_{31} & A_{32} & A_{33} \end{bmatrix}$ Correction matrix A Note that reference characters $A_{11}$ to $A_{33}$ represent correction elements that constitute the correction matrix A, and correct respective coordinate components of the probe output P.

SUMMARY OF INVENTION

Technical Problem

In Patent Literature 1, however, only first-order coordinate components (referred to as linear coordinate components) of the probe output P can be corrected with the correction elements $A_{11}$ to $A_{33}$ in the correction matrix A. Here, a so-called spring structure (including a spring body and a guide for the spring body) in a member for movably supporting the stylus in the measuring probe or a probe sensor for detecting a displacement of the stylus, for example, may not necessarily respond linearly in all of three directions. When a spring constant of the spring structure is non-linear, for example, a change in distance between the measurement tip and the drive mechanism in a direction in which the spring constant is non-linear may cause a non-linear change of the measurement tip in that direction. Moreover, a non-linear response of the spring structure, for example, may cause an arc motion of the measurement tip when a measurement force in a certain direction is applied to the measurement tip and thus cause a displacement of the measurement tip. Furthermore, a non-linear response of the probe sensor, for example, may lead to the inclusion of a non-linear error in the probe output. In other words, even when errors resulting from discrepancy between the machine coordinate system and the probe coordinate system are eliminated, there is a possibility of failing to eliminate a non-linear error in a probe output supplied from the measuring probe if the above-described spring structure or probe sensor provides a non-linear response. If correction to eliminate the non-linear error could be performed, such correction would become complex (including the preparation of a dedicated device for such a purpose and an increase in the number of measurement points). Thus, such correction cannot be performed in a simplified manner immediately before measurement.

The present invention has been made in order to solve the above-described problems in the conventional technique, and an object thereof is to provide a coordinate correction method and a coordinate measuring machine that can simplify correction immediately before measurement while allowing for correction of a non-linear error of a probe output supplied from a measuring probe.

Solution to Problem

To solve the above-described problems, an aspect of the present invention provides a coordinate correction method of a first coordinate measuring machine, the first coordinate measuring machine including: a first measuring probe having a first stylus with a first measurement tip to be brought into contact with an object to be measured, and a probe body for movably supporting the first stylus and providing a first probe output according to a displacement of the first measurement tip; a first drive mechanism for moving the first measuring probe relative to the object to be measured; and a first processing device for computing shape coordinates of the object to be measured on the basis of the first probe output and a first moving amount of the first measuring probe by the first drive mechanism. As a former correction step, the coordinate correction method includes: a step of setting a second measuring probe in a second drive mechanism of a second coordinate measuring machine, the second coordinate measuring machine including the second drive mechanism for relatively moving the second measuring probe including the probe body for movably supporting a second stylus with a second measurement tip, and a second processing device for obtaining, on the basis of a second probe output according to a displacement of the second measurement tip and a second moving amount of the second measuring probe by the second drive mechanism, a former correction matrix capable of correcting the second probe output with respect to the second moving amount; a step of restraining a translational displacement of the second measurement tip; a step of acquiring the second moving amount and the second probe output when the second measuring probe is moved by the second drive mechanism; and a step of generating the former correction matrix including second linear correction elements and second non-linear correction elements for respectively correcting linear coordinate components and non-linear coordinate components of the second probe output with the second moving amount and the second probe output acquired in each of the measurement points in a quantity larger than or equal to a sum of the number of the second linear correction elements and the number of the second non-linear correction elements. As a latter correction step, the coordinate correction method includes: a step of setting the first measuring probe in the first drive mechanism; a step of restraining a translational displacement of the first measurement tip; a step of acquiring the first moving amount and the first probe output when the first measuring probe is moved by the first drive mechanism; a step of generating an intermediate correction matrix including first linear correction elements for correcting linear coordinate components of the first probe output with the first moving amount and the first probe output; and a step of correcting the first probe output with a latter correction matrix generated on the basis of the intermediate correction matrix and the former correction matrix.

A second aspect of the present invention provides the above-described coordinate correction method wherein, the former correction step includes a step of generating a former intermediate correction matrix by multiplying the former correction matrix by an inverse matrix of a former linear correction matrix including only the second linear correction elements, and the latter correction step includes a step of generating the latter correction matrix with the former intermediate correction matrix.

A third aspect of the present invention provides the above-described coordinate correction method wherein, the step of correcting the first probe output with the latter correction matrix generated on the basis of the intermediate correction matrix and the former correction matrix includes a step of generating the latter correction matrix by multiplying the former intermediate correction matrix by the intermediate correction matrix.

A fourth aspect of the present invention provides the above-described coordinate correction method wherein, the former correction step further includes: a step of changing forms of the second measuring probe corresponding to the number of different forms of the second measuring probe and repeating from the step of setting the second measuring probe in the second drive mechanism to the step of generating the former correction matrix; and a step of generating a correlation between the second linear correction elements or the forms of the second measuring probe and non-linear correction elements of the former intermediate correction matrix on the basis of the plurality of former correction matrixes. The step of correcting the first probe output with the latter correction matrix generated on the basis of the intermediate correction matrix and the former correction matrix includes: a step of obtaining the non-linear correction elements of the former intermediate correction matrix corresponding to the first linear correction elements, instead of the second linear correction elements, or corresponding to forms of the first measuring probe, instead of the forms of the second measuring probe, with the correlation; and a step of generating the latter correction matrix with the first linear correction elements and the non-linear correction elements of the former intermediate correction matrix.

A fifth aspect of the present invention provides the above-described coordinate correction method wherein, the number of the different forms of the second measuring probe is based on the number of different forms of the second stylus, and the forms of the first measuring probe is based on forms of the first stylus.

A sixth aspect of the present invention provides the above-described coordinate correction method wherein, the step of restraining a translational displacement of the second measurement tip is a step of restraining a translational displacement of the second measurement tip at a reference position where a displacement of the second measurement tip is 0, and not-restraining rotational displacement of a center of the second measurement tip as a center of rotation. The step of acquiring the second moving amount and the second probe output when the second measuring probe is moved by the second drive mechanism is a step of acquiring the second moving amount and the second probe output at the time of the movement of the second measuring probe from the reference position to each of the measurement points.

A seventh aspect of the present invention provides the above-described coordinate correction method wherein, the step of restraining a translational displacement of the first measurement tip is a step of bringing the first measurement tip into contact with a calibration artifact. The step of acquiring the first moving amount and the first probe output when the first measuring probe is moved by the first drive mechanism include: a pushing drive step of bringing, in a normal direction to a surface of the calibration artifact, the first measurement tip into contact with the surface at a single point, pushing the calibration artifact with the first measurement tip by a predetermined displacement amount, and then moving the first measurement tip in an opposite direction to separate the first measurement tip away from the surface; and a scanning drive step of reciprocating the first measurement tip on the surface of the calibration artifact while pressing the calibration artifact with the first measurement tip by a constant deflection amount.

An eighth aspect of the present invention provides the above-described coordinate correction method wherein, the normal directions to the surface of the calibration artifact corresponds to a total of five directions including: three directions perpendicular to one another; and two directions among the three directions adding a respective inversed direction. In each of the five directions, the pushing drive step is performed.

A ninth aspect of the present invention provides the above-described coordinate correction method wherein, the first measurement tip pushes by a constant deflection amount on each of three planes perpendicular to one another in the scanning drive step.

A tenth aspect of the present invention provides a first coordinate measuring machine including: a first measuring probe having a first stylus with a first measurement tip to be brought into contact with an object to be measured, and a probe body for movably supporting the first stylus and providing a first probe output according to a displacement of the first measurement tip; a first drive mechanism for moving the first measuring probe relative to the object to be measured; and a first processing device for computing shape coordinates of the object to be measured on the basis of the first probe output and a first moving amount of the first measuring probe by the first drive mechanism. The first coordinate measuring machine includes restraining unit for restraining a translational displacement of the first measurement tip. The first processing device includes: a storage unit for storing a processed result on a second processing device of a second coordinate measuring machine, the second coordinate measuring machine including a second drive mechanism for relatively moving a second measuring probe including the probe body for movably supporting a second stylus with a second measurement tip, and the second processing device for generating, on the basis of a second probe output according to a displacement of the second measurement tip and a second moving amount of the second measuring probe by the second drive mechanism, the former correction matrix including second linear correction elements and second non-linear correction elements for respectively correcting linear coordinate components and non-linear coordinate components of the second probe output with respect to the second moving amount; a coordinate acquisition unit for acquiring the first moving amount and the first probe output when the first measuring probe is moved by the first drive mechanism; a matrix generation unit for generating an intermediate correction matrix including first linear correction elements for correcting linear coordinate components of the first probe output with the first moving amount and the first probe output; and a probe output correction unit for correcting the first probe output with a latter correction matrix generated on the basis of the intermediate correction matrix and the former correction matrix.

An eleventh aspect of the present invention provides the above-described coordinate measuring machine wherein, the storage unit stores the former correction matrix as the processed result.

A twelfth aspect of the present invention provides the above-described coordinate measuring machine wherein, the storage unit stores a former intermediate correction matrix as the processed result, the second processing device further generates the former intermediate correction matrix by multiplying the former correction matrix by an inverse matrix of a former linear correction matrix including only the second linear correction elements, and the matrix generation unit further generates the latter correction matrix by multiplying the former intermediate correction matrix by the intermediate correction matrix.

A thirteenth aspect of the present invention provides the above-described coordinate measuring machine wherein, the storage unit stores a correlation between second linear correction elements or forms of a second measuring probe and non-linear correction elements of a former intermediate correction matrix generated on the basis of a plurality of former correction matrixes corresponding to the number of different forms of the second measuring probe as the processed result, the second processing device further generates the former intermediate correction matrix by multiplying the former correction matrix by an inverse matrix of a former linear correction matrix including only the second linear correction elements, and the matrix generation unit further obtains the non-linear correction elements of the former intermediate correction matrix corresponding to the first linear correction elements, instead of the second linear correction elements, or corresponding to forms of the first measuring probe, instead of the forms of the second measuring probe, with the correlation, so as to generate the latter correction matrix with the first linear correction elements and the non-linear correction elements of the former intermediate correction matrix.

Advantageous Effects of Invention

According to the present invention, the correction immediately before measurement can be simplified while allowing for the correction of a non-linear error of the probe output supplied from the measuring probe. These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

An example of an embodiment of the present invention will be described below in detail with reference to the drawings.

A coordinate measuring machine according to a first embodiment of the present invention will now be described with reference to FIGS. 1 to 15B.

A general configuration of a coordinate measuring machine (second coordinate measuring machine) 100PR shown in FIG. 4 will be described first. In the present embodiment, the coordinate measuring machine 100PR performs a former correction step corresponding to the first-half step in performing coordinate correction.

Figure 4:
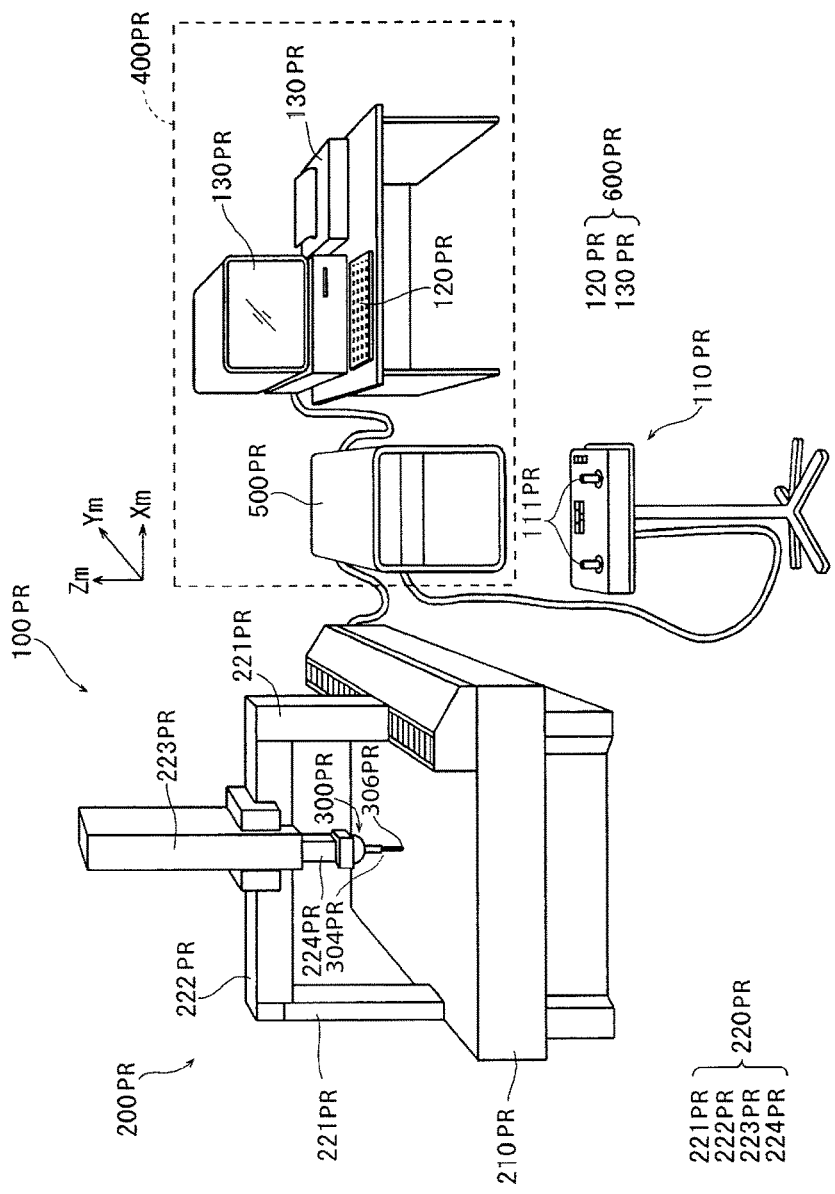
FIG. 4 is a schematic view showing an example of another coordinate measuring machine according to the first embodiment.

As shown in FIG. 4, the coordinate measuring machine 100PR includes: a machine body 200PR that moves a measuring probe (second measuring probe) 300PR; operation unit 110PR having manually-operated joysticks 111PR; and a processing device (second processing device) 400PR.

As shown in FIG. 4, the machine body 200PR includes: a surface plate 210PR; a drive mechanism (second drive mechanism) 220PR; restraining unit 240PR (FIG. 6A); and the measuring probe 300PR. The drive mechanism 220PR includes an X-axis drive mechanism 225PR, a Y-axis drive mechanism 226PR, and a Z-axis drive mechanism 227PR (FIG. 5) that are provided to stand on the surface plate 210PR for holding and three-dimensionally moving the measuring probe 300PR as shown in FIG. 4. Note that the drive mechanism is not limited thereto. For example, a drive mechanism may three-dimensionally move an object W to be measured by fixing the measuring probe and moving the surface plate itself which is positioned under the object W to be measured, or moving a member positioned on the surface plate and under the object W to be measured. Alternatively, a drive mechanism may three-dimensionally move both of the measuring probe and the object W to be measured. In other words, the drive mechanism may be any mechanism capable of moving the measuring probe relative to the object W to be measured (the same applies to a drive mechanism to be described later).

Figure 5:
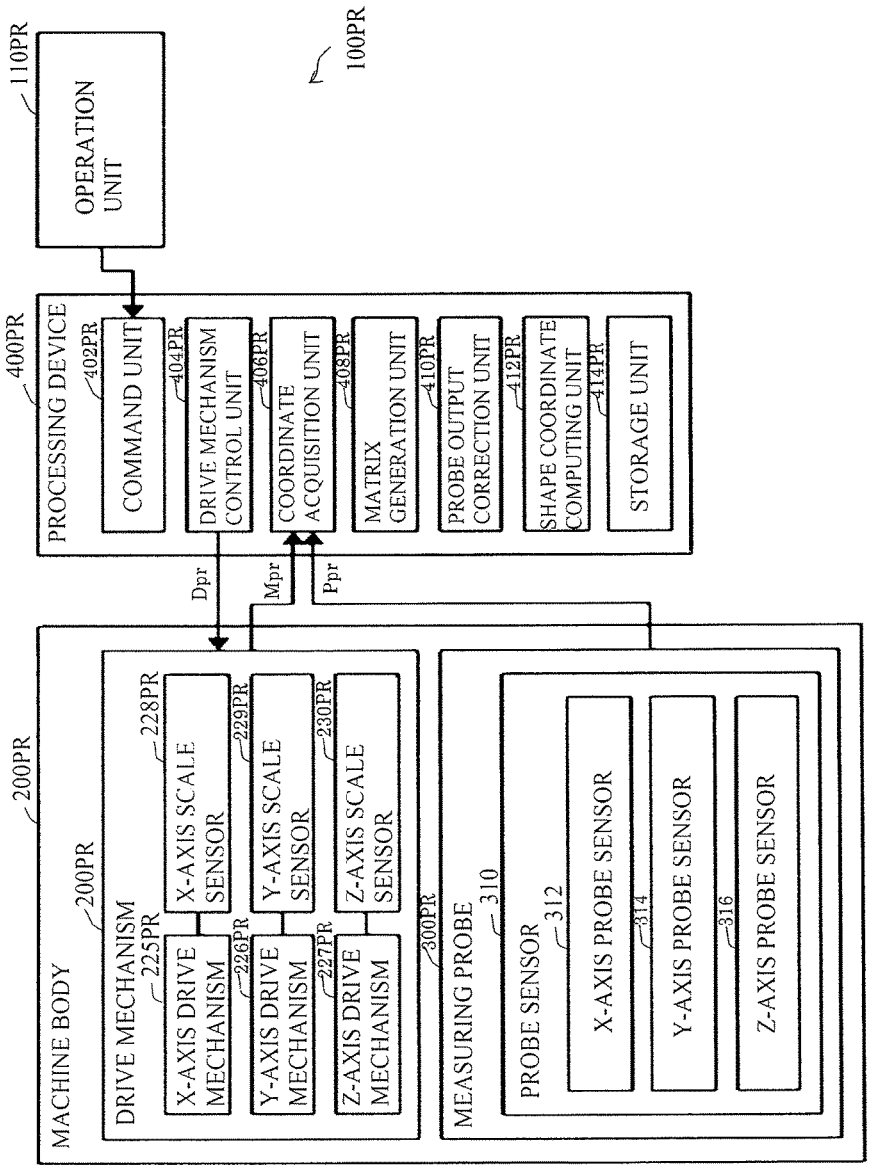
FIG. 5 is a block diagram of the coordinate measuring machine of FIG. 4.

Specifically, the drive mechanism 220PR includes: beam supports 221PR capable of moving in a Ym direction in an machine coordinate system; a beam 222PR bridged between the beam supports 221PR; a column 223PR capable of moving in an Xm direction in the machine coordinate system on the beam 222PR; and a spindle 224PR capable of moving in a Zm direction in the machine coordinate system inside the column 223PR as shown in FIG. 4. The X-axis drive mechanism 225PR, the Y-axis drive mechanism 226PR, and the Z-axis drive mechanism 227PR shown in FIG. 5 are provided between the beam 222PR and the column 223PR, between the surface plate 210PR and the beam supports 221PR, and between the column 223PR and the spindle 224PR, respectively. The measuring probe 300PR is supported by an end of the spindle 224PR.

As shown in FIG. 5, the X-axis drive mechanism 225PR, the Y-axis drive mechanism 226PR, and the Z-axis drive mechanism 227PR are provided with an X-axis scale sensor 228PR, a Y-axis scale sensor 229PR, and a Z-axis scale sensor 230PR, respectively. Thus, a moving amount (second moving amount) $\{x_m, y_m, z_m\}^T$ (referred to as "Mpr") of the measuring probe 300PR in the machine coordinate system can be obtained from outputs of the X-axis scale sensor 228PR, the Y-axis scale sensor 229PR, and the Z-axis scale sensor 230PR. In the present embodiment, the moving directions of the X-axis drive mechanism 225PR, the Y-axis drive mechanism 226PR, and the Z-axis drive mechanism 227PR coincide with the Xm direction, the Ym direction, and the Zm direction in the machine coordinate system, respectively.

Figure 6A:
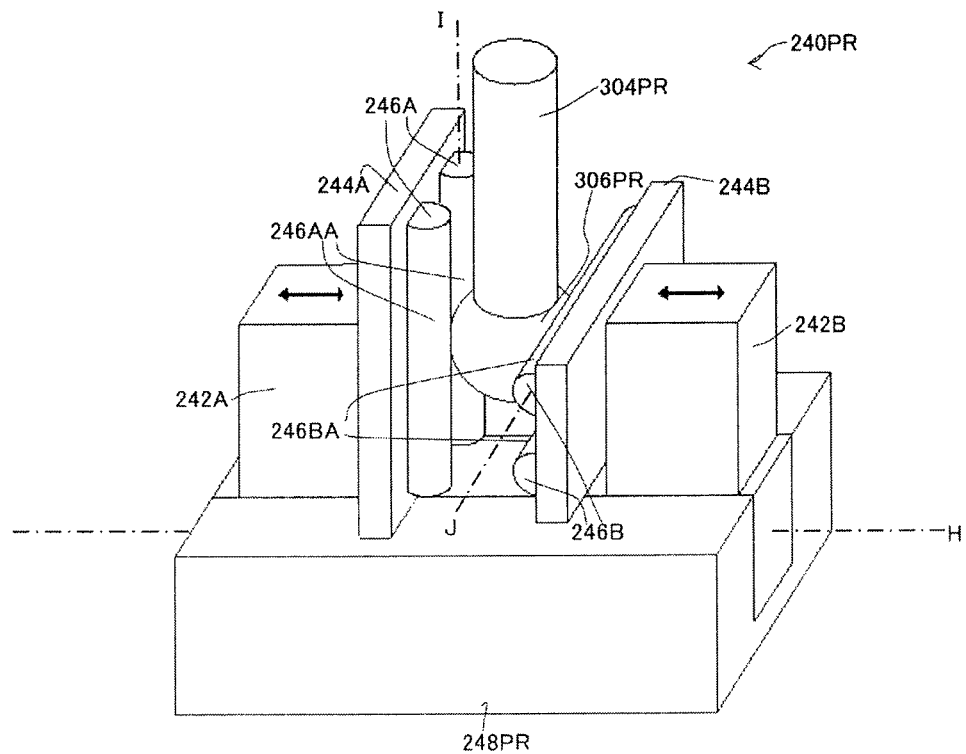
FIG. 6A is a perspective view showing restraining unit for restraining a translational displacement of a measurement tip in the coordinate measuring machine of FIG. 4.

As shown in FIG. 6A, the restraining unit 240PR is a member disposed on the surface plate 210PR for restraining a translational displacement of a measurement tip 306PR of the measuring probe 300PR. In addition, the restraining unit 240PR is configured to restrain no rotational displacement of a center of the measurement tip 306PR as a center of rotation (alternatively, the restraining unit 240PR may restrain a rotational displacement suitably). Specifically, the restraining unit 240PR includes: two pressing members 242A and 242B; two plate-shaped members 244A and 244B; four columnar parts 246A and 246B; and a base member 248PR. The two pressing members 242A and 242B are each formed in a rectangular column. The pressing members 242A and 242B are disposed to be slidable, by hand or electrically, in a direction indicated by black arrows in FIG. 6A (i.e., an opposed direction H along which the two pressing members 242A and 242B are opposed to each other) along a groove provided in the base member 248PR disposed on the surface plate 210PR. In other words, the two pressing members 242A and 242B can press the measurement tip 306PR by being arranged to oppose each other with the measurement tip 306PR sandwiched therebetween.

As shown in FIG. 6A, the plate-shaped members 244A and 244B are attached to opposed side surfaces of the two pressing members 242A and 242B, respectively. The plate-shaped members 244A and 244B are each formed in a rectangular shape having a plane perpendicular to the opposed direction H, and longitudinal directions (directions I and J) thereof are perpendicular to each other. The two columnar parts 246A and the two columnar parts 246B are attached to opposed side surfaces of the plate-shaped members 244A and 244B, respectively, in such a manner that side surfaces thereof protrude. Axes of the two columnar parts 246A are arranged in parallel to the direction I, and axes of the two columnar parts 246B are arranged in parallel to the direction J. Here, the directions I and J are both perpendicular to the opposed direction H. In other words, the two parallel columnar parts 246A and 246B having their axes in the directions I and J perpendicular to the opposed direction H are provided on the side of the two pressing members 242A and 242B closer to the measurement tip, respectively. The directions I and J are also perpendicular to each other. The side surfaces of the two columnar parts 246A and the side surfaces of the two columnar parts 246B serve as contact parts 246AA and 246BA to be brought into contact with the measurement tip 306PR. The measurement tip 306PR is sandwiched between the columnar parts 246A and 246B. In other words, the axis directions I and J of the columnar parts 246A in one pressing member 242A and the columnar parts 246B in the other pressing member 242B are provided perpendicular to each other, and the columnar parts 246A and 246B are provided with the contact parts 246AA and 246BA, respectively. Since the four contact parts 246AA and 246BA are provided in total, the restraining unit 240PR can restrain (restrict) a translational displacement of the measurement tip 306PR in any direction. In other words, with such a simple configuration, the restraining unit 240PR can avoid restraining a rotational displacement of the measurement tip 306PR while easily restraining a translational displacement of the measurement tip 306PR by adjusting a distance between the pressing members 242A and 242B.

Figure 6B:
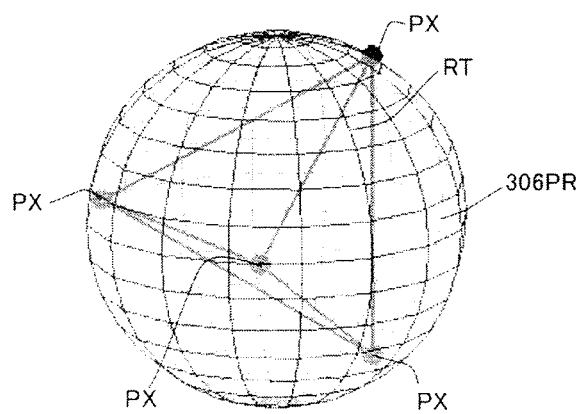
FIG. 6B is a diagram showing positions at which the measurement tip of the coordinate measuring machine of FIG. 4 is brought into contact with the restraining unit.

The contact parts 246AA and 246BA of the restraining unit 240PR are configured to be brought into contact with the measurement tip 306PR at positions of four vertices PX of a regular tetrahedron RT inscribed in the measurement tip 306PR shown in FIG. 6B. Thus, the restraining unit 240PR is provided with a minimum number (four) of the contact parts 246AA and 246BA for restraining a translational displacement of the measurement tip 306PR in any direction, and the contact parts 246AA and 246BA are positioned at spatially equal intervals. Consequently, force applied to the measurement tip 306PR by the columnar parts 246A and 246B can be distributed in a spatially equal manner. This can prevent an excessive amount of force from being applied only to part of four contact points between the measurement tip 306PR and the contact parts 246AA and 246BA. Note that the present invention is not limited thereto. For example, no contact parts may be located at the positions of the vertices PX of the regular tetrahedron RT, or five or more contact parts may be provided.

Figure 8:
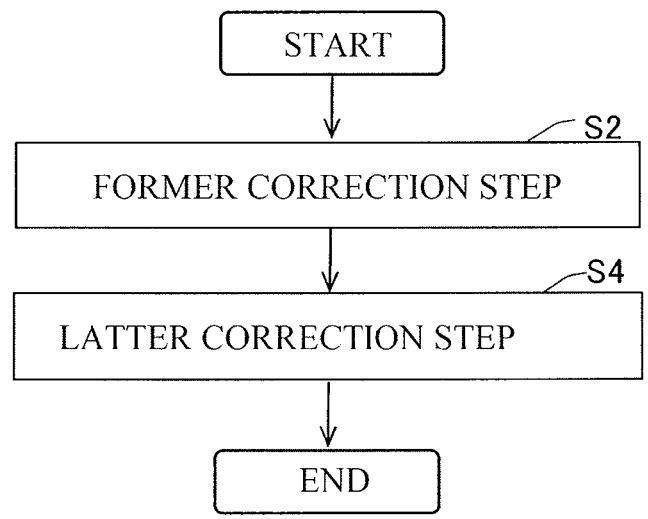
FIG. 8 is a flow chart showing a procedure of performing coordinate correction with the coordinate measuring machines of FIGS. 1 and 4.

Note that the restraining unit 240PR may have a configuration as shown in FIG. 8 in Patent Literature 1. More specifically, the columnar parts 246A and 246B of the restraining unit 240PR may each be formed in a circular cylinder and configured to be rotatable about its axis and movable to some extent in its axis direction. In this case, the restraining unit 240PR can restrain a translational displacement of the measurement tip 306PR without restraining a rotational displacement of the measurement tip 306PR even when pressing force to the measurement tip 306PR by the pressing members 242A, 242B is large to some extent.

Figure 9:
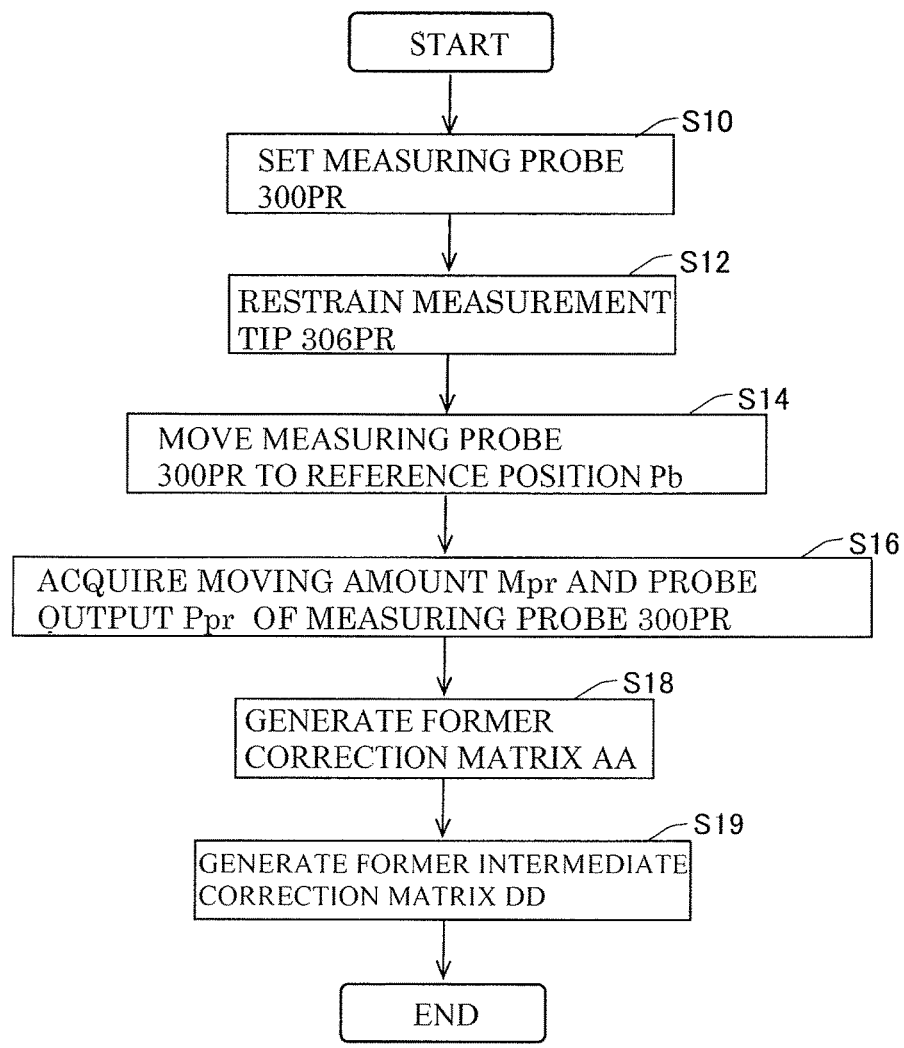
FIG. 9 is a flow chart showing an example of a procedure of a former correction step of FIG. 8.

Alternatively, the restraining unit 240PR may have a configuration as shown in FIG. 9 in Patent Literature 1. More specifically, restraining unit may include four pressing members for pressing the measurement tip 306PR toward the center of the measurement tip 306PR, and the pressing members may each have a spherical abutting member to be brought into contact with the measurement tip 306PR and a support member for rotatably supporting the abutting member. In this case, the restraining unit can restrain a translational displacement of the measurement tip 306PR without restraining a rotational displacement of the measurement tip 306PR in any direction.

Figure 7:
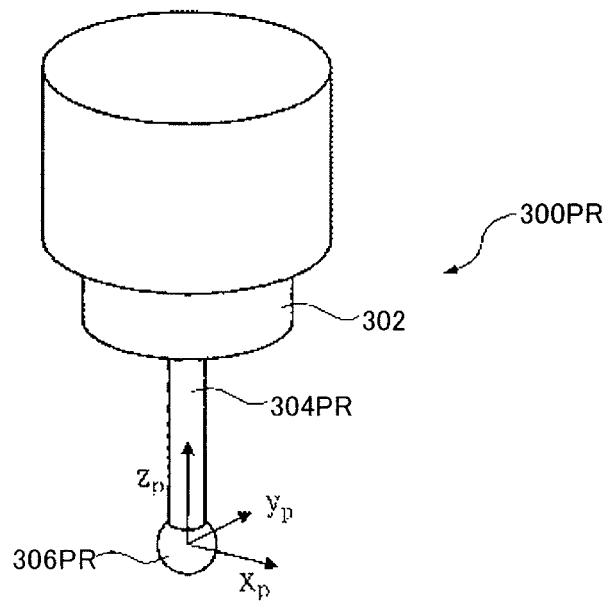
FIG. 7 is a perspective view showing a measuring probe of the coordinate measuring machine of FIG. 4.

The measuring probe 300PR is what is called a scanning probe. As shown in FIG. 7, the measuring probe 300PR includes: a stylus (second stylus) 304PR having a spherical measurement tip (second measurement tip) 306PR to be brought into contact with the object W to be measured; and a probe body 302 for movably supporting the stylus 304PR. The probe body 302 provides a probe output (second probe output) $\{x_p, y_p, z_p\}^T$ (referred to as "Ppr") according to a displacement of the measurement tip 306PR. Here, the stylus 304PR is supported by a spring structure that gives a non-linear response, for example, in the probe body 302. A displacement of the stylus 304PR in the measuring probe 300PR is detected by a probe sensor 310 built into the probe body 302.

As shown in FIG. 5, the probe sensor 310 includes: an X-axis probe sensor 312 for detecting a displacement of the measurement tip 306PR in an Xp direction (FIG. 7) in a probe coordinate system; a Y-axis probe sensor 314 for detecting a displacement of the measurement tip 306PR in a Yp direction in the probe coordinate system; and a Z-axis probe sensor 316 for detecting a displacement of the measurement tip 306PR in a Zp direction in the probe coordinate system. Thus, the probe output Ppr, i.e., coordinates of the measurement tip 306PR in the probe coordinate system, can be obtained from the outputs of the X-axis probe sensor 312, the Y-axis probe sensor 314, and the Z-axis probe sensor 316. Note that the X-axis probe sensor 312, the Y-axis probe sensor 314, and the Z-axis probe sensor 316 may not directly indicate a probe output P.

As shown in FIG. 5, the operation unit 110PR is connected to a command unit 402PR of the processing device 400PR. Various commands can be inputted to the machine body 200PR and the processing device 400PR via the operation unit 110PR.

As shown in FIG. 4, the processing device 400PR includes a motion controller 500PR and a host computer 600PR. The processing device 400PR computes shape coordinates XX of the object W to be measured on the basis of the probe output Ppr and the moving amount Mpr of the measuring probe 300PR by the drive mechanism 220PR. The motion controller 500PR mainly controls the movement and measurement of the measuring probe 300PR. The host computer 600PR mainly processes measured results obtained in the machine body 200PR. In the present embodiment, the processing device 400PR having a combined function of the motion controller 500PR and the host computer 600PR is shown in the block diagram of FIG. 5 and will be described below. The host computer 600PR includes input unit 120PR such as a keyboard and output unit 130PR such as a display and a printer.

As shown in FIG. 5, the processing device 400PR includes: the command unit 402PR, a drive mechanism control unit 404PR, a coordinate acquisition unit 406PR, a matrix generation unit 408PR, a probe output correction unit 410PR, a shape coordinate computing unit 412PR, and a storage unit 414PR. Since both of the probe output correction unit 410PR and the shape coordinate computing unit 412PR are not used in the present embodiment, the processing device 400PR may not include these units.

The command unit 402PR shown in FIG. 5 gives predetermined commands to the drive mechanism control unit 404PR on the basis of commands inputted by the operation unit 110PR or the input unit 120PR. The command unit 402PR generates, as a positional command to the drive mechanism 220PR, a coordinate value in the machine coordinate system for each control cycle in consideration of, for example, moving directions, moving distances, moving speeds, and the like to move the measuring probe 300PR to a plurality of positions (measurement points). For example, the command unit 402PR may also issue a command about timing for acquiring both of the moving amount Mpr of the measuring probe 300PR by the drive mechanism 220PR and the probe output Ppr or the number of such acquisitions (the number n of measurement points) to the coordinate acquisition unit 406PR.

The drive mechanism control unit 404PR shown in FIG. 5 can perform drive control by outputting a drive control signal Dpr in response to a command from the command unit 402PR and thereby passing an electric current through motors of the X-axis, Y-axis, and Z-axis drive mechanisms 225PR, 226PR, and 227PR in the drive mechanism 220PR.

The coordinate acquisition unit 406PR shown in FIG. 5 acquires the moving amount Mpr of the measuring probe 300PR in the machine coordinate system, which is outputted from the drive mechanism 220PR, and the probe output Ppr in the probe coordinate system, which is outputted from the probe sensor 310, respectively. The coordinate acquisition unit 406PR then computes the acquired data into a form (the number of data pieces and a data form) required in the matrix generation unit 408PR and outputs the result to the matrix generation unit 408PR (such computation may be performed in the matrix generation unit 408PR and the coordinate acquisition unit 406PR may only acquire the probe output Ppr and the moving amount Mpr of the measuring probe 300PR). Specifically, the coordinate acquisition unit 406PR outputs a moving amount Mn and a probe output Pn of the measuring probe 300PR corresponding to the number of measurement points (the number of acquisitions) n necessary to generate a former correction matrix AA. At this time, regarding the probe output Ppr, the coordinate acquisition unit 406PR computes second-order or higher-order coordinate components $x_p^2$, $y_p^2$, $z_p^2$, . . . and interference coordinate components $x_p y_p$, $y_p z_p$, $z_p x_p$, . . . from the first-order coordinate components $x_p$, $y_p$, and $z_p$ of the probe output Ppr.

The matrix generation unit 408PR shown in FIG. 5 generates the former correction matrix AA on the basis of the outputs (the moving amount Mn and the probe output Pn of the measuring probe 300PR) from the coordinate acquisition unit 406PR. At this time, the measuring probe 300PR is positioned in such a state that a translational displacement of the measurement tip 306PR is being restrained at a position (reference position Pb) where the probe output Ppr is 0, for example. Thereafter, when the measuring probe 300PR is moved, the moving amount Mpr of the measuring probe 300PR from the reference position Pb and a probe output (transformed output PM) after corrected with the former correction matrix AA have equal absolute values and inverted signs. In other words, the outputs (the moving amount Mn and the probe output Pn of the measuring probe 300PR) from the coordinate acquisition unit 406PR satisfy Formula (4).

$$\{Mn\} = -[AA]\{Pn\} \quad \text{Formula (4)}$$

$$\begin{Bmatrix} x_{m1} & x_{m2} & \cdots & x_{mn} \\ y_{m1} & y_{m2} & \cdots & y_{mn} \\ z_{m1} & z_{m2} & \cdots & z_{mn} \end{Bmatrix} = \quad \text{Formula (5)}$$

$$-\begin{bmatrix} A_{11} & A_{12} & A_{13} & A_{14} & A_{15} & A_{16} & A_{17} & A_{18} & A_{19} & \cdots \\ A_{21} & A_{22} & A_{23} & A_{24} & A_{25} & A_{26} & A_{27} & A_{28} & A_{29} & \cdots \\ A_{31} & A_{32} & A_{33} & A_{34} & A_{35} & A_{36} & A_{37} & A_{38} & A_{39} & \cdots \end{bmatrix}$$

$$\times \begin{Bmatrix} x_{p1} & x_{p2} & \cdots & x_{pn} \\ y_{p1} & y_{p2} & \cdots & y_{pn} \\ z_{p1} & z_{p2} & \cdots & z_{pn} \\ x_{p1}^2 & x_{p2}^2 & \cdots & x_{pn}^2 \\ y_{p1}^2 & y_{p2}^2 & \cdots & y_{pn}^2 \\ z_{p1}^2 & z_{p2}^2 & \cdots & z_{pn}^2 \\ x_{p1}y_{p1} & x_{p2}y_{p2} & \cdots & x_{pn}y_{pn} \\ x_{p1}z_{p1} & x_{p2}z_{p2} & \cdots & x_{pn}z_{pn} \\ y_{p1}z_{p1} & y_{p2}z_{p2} & \cdots & y_{pn}z_{pn} \\ \vdots & \vdots & \cdots & \vdots \end{Bmatrix} \text{Where}$$

Moving amount $Mn$ of Measuring probe 300PR:

$$\begin{Bmatrix} x_{m1} & x_{m2} & \cdots & x_{mn} \\ y_{m1} & y_{m2} & \cdots & y_{mn} \\ z_{m1} & z_{m2} & \cdots & z_{mn} \end{Bmatrix}$$

Probe output $Pn$: 
$$\begin{Bmatrix} x_{p1} & x_{p2} & \cdots & x_{pn} \\ y_{p1} & y_{p2} & \cdots & y_{pn} \\ z_{p1} & z_{p2} & \cdots & z_{pn} \\ x_{p1}^2 & x_{p2}^2 & \cdots & x_{pn}^2 \\ y_{p1}^2 & y_{p2}^2 & \cdots & y_{pn}^2 \\ z_{p1}^2 & z_{p2}^2 & \cdots & z_{pn}^2 \\ x_{p1}y_{p1} & x_{p2}y_{p2} & \cdots & x_{pn}y_{pn} \\ x_{p1}z_{p1} & x_{p2}z_{p2} & \cdots & x_{pn}z_{pn} \\ y_{p1}z_{p1} & y_{p2}z_{p2} & \cdots & y_{pn}z_{pn} \\ \vdots & \vdots & \cdots & \vdots \end{Bmatrix}$$

Former correction matrix $AA$:

$$\begin{bmatrix} A_{11} & A_{12} & A_{13} & A_{14} & A_{15} & A_{16} & A_{17} & A_{18} & A_{19} & \cdots \\ A_{21} & A_{22} & A_{23} & A_{24} & A_{25} & A_{26} & A_{27} & A_{28} & A_{29} & \cdots \\ A_{31} & A_{32} & A_{33} & A_{34} & A_{35} & A_{36} & A_{37} & A_{38} & A_{39} & \cdots \end{bmatrix}$$

The former correction matrix AA includes: linear correction elements (second linear correction elements) $A_{LE}$ for correcting linear coordinate components of the probe output Ppr with respect to the moving amount Mpr of the measuring probe 300PR; and non-linear correction elements (second non-linear correction elements) $A_{NLE}$ for correcting non-linear coordinate components of the probe output Ppr with respect to the moving amount Mpr of the measuring probe 300PR. Note that the linear coordinate components refer to the first-order coordinate components $x_p$, $y_p$, and $z_p$, and the non-linear coordinate components refer to the second-order or higher-order coordinate components $x_p^2$, $y_p^2$, $z_p^2$, . . . and the interference coordinate components $x_p y_p$, $y_p z_p$, $z_p x_p$, . . . . The linear correction elements $A_{LE}$ refer to elements $A_{11}$, $A_{12}$, $A_{13}$, $A_{21}$, $A_{22}$, $A_{23}$, $A_{31}$, $A_{32}$, and $A_{33}$ by which the linear coordinate components $x_p$, $y_p$, and $z_p$ are multiplied.

The non-linear correction elements $A_{NLE}$ refer to the other elements $A_{14}, A_{15}, \ldots, A_{24}, A_{25}, \ldots, A_{34}, A_{35}, \ldots$ by which the non-linear coordinate components $x_p^2, y_p^2, z_p^2, \ldots$, $x_p y_p, y_p z_p, z_p x_p, \ldots$ are multiplied.

In other words, as shown in Formula (6), the matrix generation unit 408PR can generate the former correction matrix AA by applying, for example, the least-squares method to Formula (4).

$$[AA] = -\{Mn\}\{Pn\}^T (\{Pn\}\{Pn\}^T)^{-1} \quad \text{Formula (6)}$$

Note that the number n of the measurement points is set to be larger than or equal to the sum of the number of the linear correction elements $A_{LE}$ and the number of the non-linear correction elements $A_{NLE}$. In other words, the coordinate acquisition unit 406PR acquires the moving amount Mpr and the probe output Ppr of the measuring probe 300PR in each of the measurement points in a quantity larger than or equal to the sum of the number of the linear correction elements $A_{LE}$ and the number of the non-linear correction elements $A_{NLE}$.

As shown in Formula (7), the matrix generation unit 408PR generates a former intermediate correction matrix DD by multiplying the former correction matrix AA by an inverse matrix of a former linear correction matrix CC including only the linear correction elements $A_{LE}$ of the former correction matrix AA. Note that non-linear correction elements (intermediate non-linear correction elements) $D_{NLE}$ in the former intermediate correction matrix DD are elements $C_{14}, C_{15}, \ldots$. The former intermediate correction matrix DD may be generated in a matrix generation unit 408.

$$[CC]^{-1}[AA] = [DD]$$

$$\begin{bmatrix} A_{11} & A_{12} & A_{13} \\ A_{21} & A_{22} & A_{23} \\ A_{31} & A_{32} & A_{33} \end{bmatrix}^{-1}$$

$$\begin{bmatrix} A_{11} & A_{12} & A_{13} & A_{14} & A_{15} & A_{16} & A_{17} & A_{18} & A_{19} & \ldots \\ A_{21} & A_{22} & A_{23} & A_{24} & A_{25} & A_{26} & A_{27} & A_{28} & A_{29} & \ldots \\ A_{31} & A_{32} & A_{33} & A_{34} & A_{35} & A_{36} & A_{37} & A_{38} & A_{39} & \ldots \end{bmatrix} =$$

$$\begin{bmatrix} 1 & 0 & 0 & C_{14} & C_{15} & C_{16} & C_{17} & C_{18} & C_{19} & \ldots \\ 0 & 1 & 0 & C_{24} & C_{25} & C_{26} & C_{27} & C_{28} & C_{29} & \ldots \\ 0 & 0 & 1 & C_{34} & C_{35} & C_{36} & C_{37} & C_{38} & C_{39} & \ldots \end{bmatrix}$$

Formula (7)

The probe output correction unit 410PR shown in FIG. 5 can correct the probe output Ppr acquired by the coordinate acquisition unit 406PR with the former correction matrix AA outputted from the matrix generation unit 408PR.

The shape coordinate computing unit 412PR shown in FIG. 5 can compute the shape coordinates XX of the object W to be measured by adding the transformed output PM supplied from the probe output correction unit 410PR to the moving amount Mpr of the measuring probe 300PR acquired by the coordinate acquisition unit 406PR.

The storage unit 414PR shown in FIG. 5 stores initial values for various types of control, initial values for various types of processing, and programs, for example. The storage unit 414PR also stores the former correction matrix AA, the former linear correction matrix CC, the former intermediate correction matrix DD, and the like generated in the matrix generation unit 408PR as a processed result (including the former correction matrix AA itself) in the processing device 400PR based on the former correction matrix AA.

A general configuration of a coordinate measuring machine (first coordinate measuring machine) 100 shown in FIG. 1 will be described next. In the present embodiment, the coordinate measuring machine 100 performs a latter correction step, which comes after the former correction step, in performing the coordinate correction.

Figure 1:
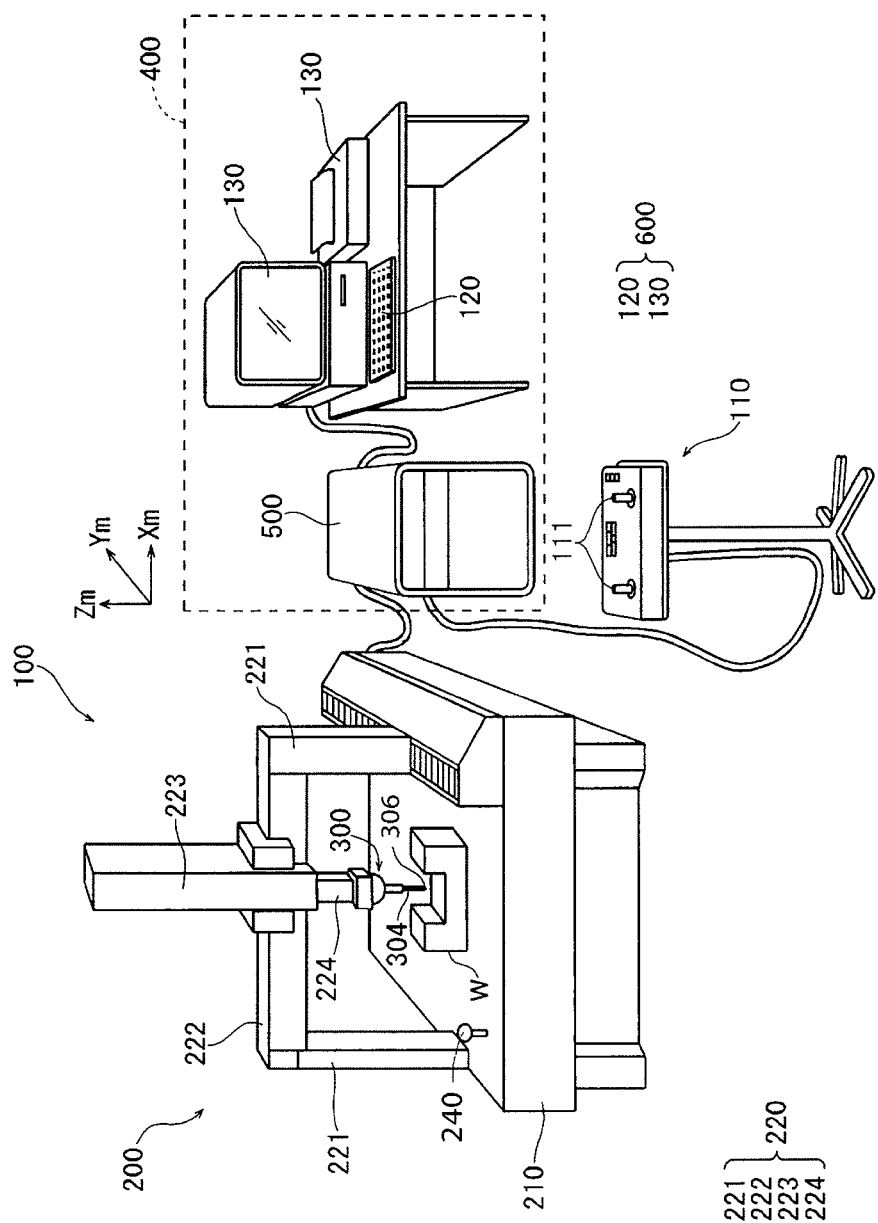
FIG. 1 is a schematic view showing an example of a coordinate measuring machine according to a first embodiment of the present invention.
Figure 2:
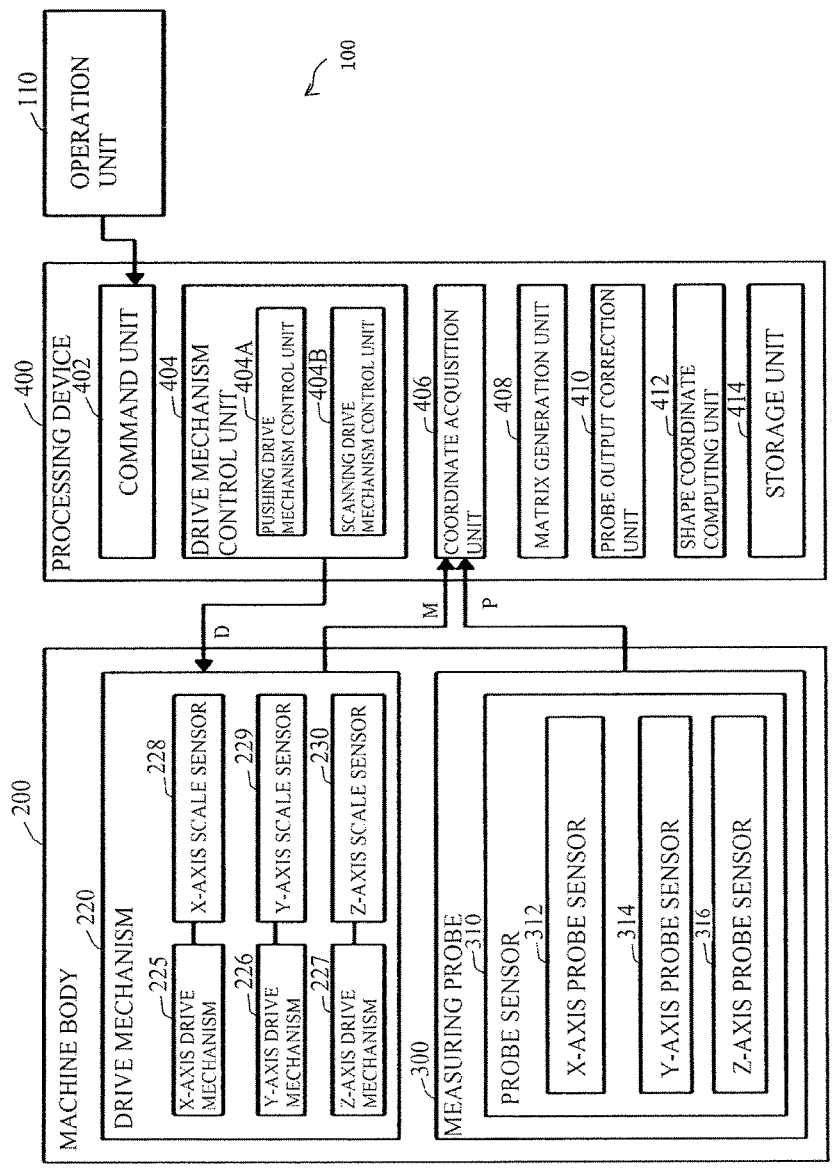
FIG. 2 is a block diagram of the coordinate measuring machine of FIG. 1.
Figure 3:
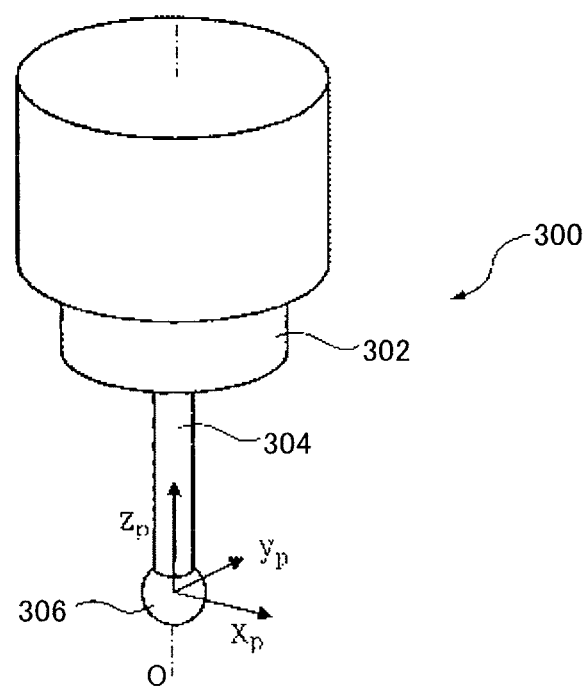
FIG. 3 is a perspective view illustrating a measuring probe of the coordinate measuring machine of FIG. 1.

As shown in FIG. 1, the coordinate measuring machine 100 includes: a machine body 200 that moves a measuring probe (first measuring probe) 300; operation unit 110 having manually-operated joysticks 111; and a processing device (first processing device) 400. As shown in FIGS. 1 to 3, the coordinate measuring machine 100 has substantially the same configurations and functions as those in the coordinate measuring machine 100PR. Therefore, elements having the same configurations and functions in the coordinate measuring machine 100 are each denoted by a reference numeral that is obtained by eliminating the alphabetical characters "PR" in the last two digits and specific description thereof will be omitted appropriately.

As shown in FIG. 1, the machine body 200 includes: a surface plate 210; a drive mechanism (first drive mechanism) 220; a calibration artifact (restraining unit) 240; and the measuring probe 300. The drive mechanism 220 includes an X-axis drive mechanism 225, a Y-axis drive mechanism 226, and a Z-axis drive mechanism 227 (FIG. 2) that are provided to stand on the surface plate 210 for holding and three-dimensionally moving the measuring probe 300 as shown in FIG. 1. As shown in FIG. 2, the X-axis drive mechanism 225, the Y-axis drive mechanism 226, and the Z-axis drive mechanism 227 are provided with an X-axis scale sensor 228, a Y-axis scale sensor 229, and a Z-axis scale sensor 230, respectively. Thus, a moving amount (first moving amount) $\{x_m, y_m, z_m\}^T$ (referred to as "M") of the measuring probe 300 in an machine coordinate system can be obtained from outputs of the X-axis scale sensor 228, the Y-axis scale sensor 229, and the Z-axis scale sensor 230. In the present embodiment, the moving directions of the X-axis drive mechanism 225, the Y-axis drive mechanism 226, and the Z-axis drive mechanism 227 coincide with an Xm direction, a Ym direction, and a Zm direction in the machine coordinate system, respectively.

As shown in FIG. 1, the calibration artifact 240 is a spherical member (also referred to as a reference sphere) and disposed on the surface plate 210. Since the calibration artifact 240 is a spherical member, all normal lines to the surface of the calibration artifact 240 pass through the center of the calibration artifact 240. Note that the calibration artifact 240 is not limited to such a spherical member. For example, the calibration artifact 240 may be any restraining unit formed in the shape of a circular cylinder, a rectangular column, a polygonal column, or the like, including a recess in a central portion of such a column and capable of restraining a translational displacement of a measurement tip.

As shown in FIG. 3, the measuring probe 300 includes: a stylus (first stylus) 304 having a spherical measurement tip (first measurement tip) 306 to be brought into contact with an object W to be measured; and the probe body 302 (of the measuring probe 300PR) for movably supporting the stylus 304. In other words, the probe body 302 including the probe sensor 310 is employed both in the measuring probe 300 and the measuring probe 300PR. In the coordinate measuring machine 100, a probe output (first probe output) P is outputted from the probe sensor 310.

As shown in FIG. 1, the processing device 400 includes a motion controller 500 and a host computer 600. The processing device 400 computes shape coordinates XX of the object W to be measured on the basis of the probe output P and the moving amount M of the measuring probe 300 by the drive mechanism 220. In the present embodiment, the processing device 400 having a combined function of the motion controller 500 and the host computer 600 is shown in the block diagram of FIG. 2 and will be described below.

As shown in FIG. 2, the processing device 400 includes: a command unit 402, a drive mechanism control unit 404, a coordinate acquisition unit 406, the matrix generation unit 408, a probe output correction unit 410, a shape coordinate computing unit 412, and a storage unit 414.

The command unit 402 shown in FIG. 2 gives predetermined commands to the drive mechanism control unit 404 on the basis of commands inputted by the operation unit 110 or input unit 120. The command unit 402 generates, as a positional command to the drive mechanism 220, a coordinate value in the machine coordinate system for each control cycle in consideration of, for example, moving directions, moving distances, moving speeds, and the like to move the measuring probe 300 to a plurality of positions (measurement points). For example, the command unit 402 may also issue a command about timing for acquiring both of the moving amount M of the measuring probe 300 by the drive mechanism 220 and the probe output P or the number of such acquisitions (the number n1 of measurement points) to the coordinate acquisition unit 406.

The drive mechanism control unit 404 shown in FIG. 2 can perform drive control by outputting a drive control signal D in response to a command from the command unit 402 and thereby passing an electric current through motors of the X-axis, Y-axis, and Z-axis drive mechanisms 225, 226, and 227 in the drive mechanism 220. Specifically, the drive mechanism control unit 404 includes a pushing drive mechanism control unit 404A and a scanning drive mechanism control unit 404B.

Figure 12A:
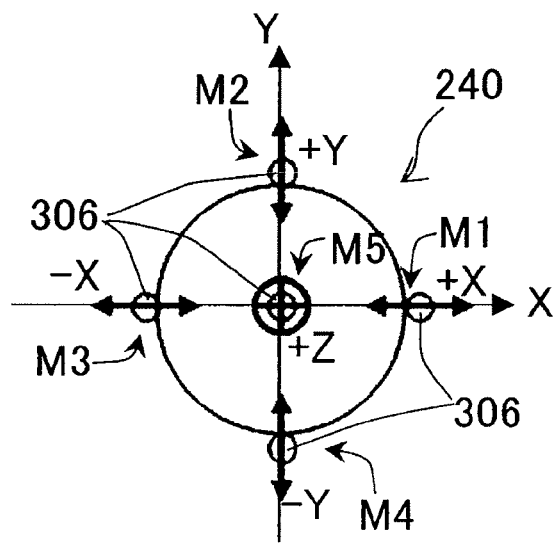
FIG. 12A is a top view showing positional relationships between the measurement tip and a calibration artifact when the pushing measurements of FIG. 11 are performed.

The pushing drive mechanism control unit 404A causes the drive mechanism 220 to perform a pushing drive step of: bringing the measurement tip 306 into contact with the surface of the calibration artifact 240 at a single point in each of normal directions to the surface of the calibration artifact 240; pushing the calibration artifact 240 with the measurement tip 306 by a predetermined displacement amount; and then moving the measurement tip 306 in the opposite direction to separate the measurement tip 306 away from the surface. For example, five directions in the pushing drive mechanism control unit 404A refer to: three directions perpendicular to one another (the three directions of X, Y, and Z); and two directions (the X direction and the Y direction) among such three directions adding (having) a respective inversed direction (i.e., in each of the two directions, the directions of the measurement forces are opposite to each other; a +X direction and a −X direction in the X direction, and a +Y direction and a −Y direction in the Y direction) as shown in FIG. 12A.

Figure 15A:
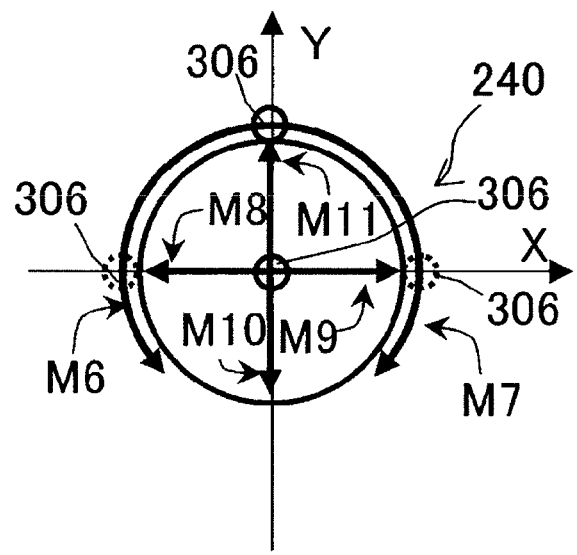
FIG. 15A is a top view showing positional relationships between the measurement tip and the calibration artifact when the scanning measurements of FIG. 14 are performed.
Figure 15B:
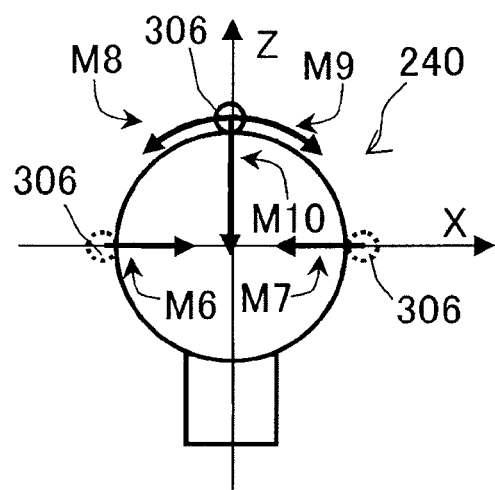
FIG. 15B is a side view showing the positional relationships between the measurement tip and the calibration artifact when the scanning measurements of FIG. 14 are performed.

The scanning drive mechanism control unit 404B controls the drive mechanism 220 to perform a scanning drive step of reciprocating the measurement tip 306 on the surface of the calibration artifact 240 while pressing the calibration artifact 240 with the measurement tip 306 by a constant deflection amount (obtained by the probe output P) on each of three planes perpendicular to one another. The three planes in the scanning drive mechanism control unit 404B are an X-Y plane, an X-Z plane, and a Y-Z plane, for example, as shown in FIGS. 15A and 15B. On each of the planes, the measurement tip 306 moves clockwise and counterclockwise along the surface of the calibration artifact 240 by the scanning drive mechanism control unit 404B.

In the present embodiment, each of the X direction, the Y direction, and the Z direction is a normal direction to the surface of the calibration artifact 240, and the Z direction coincides with an axial direction O of the stylus 304. More specifically, the five directions in the pushing drive mechanism control unit 404A include: the axial direction O of the stylus 304; two directions perpendicular to each other in a plane perpendicular to the axial direction O; and two directions having measurement forces opposite to those of the two directions perpendicular to each other. Thus, the X direction, the Y direction, and the Z direction coincide with the Xm direction, the Ym direction, and the Zm direction in the machine coordinate system, respectively. While the three directions of X, Y, and Z in the pushing drive mechanism control unit 404A and the three directions of X, Y, and Z in the scanning drive mechanism control unit 404B have the same notations for the sake of convenience, these directions may be shifted from each other. The drive mechanism control unit 404 also controls the drive mechanism 220 to obtain the center of the calibration artifact 240.

The coordinate acquisition unit 406 shown in FIG. 2 acquires the moving amount M and the probe output P of the measuring probe 300 when the measuring probe 300 is moved by the drive mechanism 220. Specifically, when the measurement tip 306 engages (is in contact) with the calibration artifact 240 by the pushing drive mechanism control unit 404A and the scanning drive mechanism control unit 404B, the coordinate acquisition unit 406 acquires the moving amount M of the measuring probe 300 in the machine coordinate system, which is outputted from the drive mechanism 220, and the probe output P in the probe coordinate system, which is outputted from the probe sensor 310. Acquiring the moving amount M and the probe output P of the measuring probe 300 when the measurement tip 306 engages with the calibration artifact 240 in the pushing drive step performed by the pushing drive mechanism control unit 404A is hereinafter referred to as a "pushing measurement." Acquiring the moving amount M and the probe output P of the measuring probe 300 when the measurement tip 306 engages with the calibration artifact 240 in the scanning drive step performed by the scanning drive mechanism control unit 404B is hereinafter referred to as a "scanning measurement."

The coordinate acquisition unit 406 computes the acquired data into a form required by the matrix generation unit 408 (the number of data pieces and a data form) and outputs the result to the matrix generation unit 408 (such computation may be performed in the matrix generation unit 408 and the coordinate acquisition unit 406 may only acquire the probe output P and the moving amount M of the measuring probe 300). Specifically, the coordinate acquisition unit 406 outputs the moving amounts M and the probe outputs P of the measuring probe 300 corresponding to the number n1 of measurement points (the number of acquisitions) necessary to generate an intermediate correction matrix BB by the pushing measurements and the scanning measurements. For example, the number n1 of measurement points equals 5p+4q, which is the sum of 5p (p is an integer larger than or equal to 1) deriving from the five directions in the pushing measurements and 4q (q is an integer larger than or equal to 1) deriving from the reciprocation on the three planes in the scanning measurements (corresponding to a total of four rounds (of the calibration artifact 240) in the case of 360 degrees on the X-Y plane and about 180 degrees on each of the X-Z plane and the Y-Z plane as shown in FIGS. 15A and 15B). If no intermediate correction matrix BB is generated in the matrix generation unit 408, the coordinate acquisition unit 406 directly outputs the probe output P and the moving amount M of the measuring probe 300 to the probe output correction unit 410 and the shape coordinate computing unit 412 respectively without changing their forms.

The matrix generation unit 408 shown in FIG. 2 generates the intermediate correction matrix BB including linear correction elements (first linear correction elements) $B_{LE}$ for correcting linear coordinate components of the probe output P with the outputs (the moving amount M and the probe output of the measuring probe 300P) of the coordinate acquisition unit 406. When the measurement tip 306 and the calibration artifact 240 are in contact with each other, a distance between a center $\{x_{pm}, y_{pm}, z_{pm}\}^T$ (referred to as "PXx") of the measurement tip 306 in the machine coordinate system, which is obtained by using the intermediate correction matrix BB, and a center $\{x_c, y_c, z_c\}^T$ (referred to as "PC") of the calibration artifact 240 ideally coincides with the sum R of a radius of a measurement sphere of the measurement tip 306 and a radius of the reference sphere, i.e., the calibration artifact 240 (referred to as a distance between the measurement tip 306 and the calibration artifact 240). In reality, however, in the i-th (1≤i≤n1) output of the coordinate acquisition unit 406, a distance between a center $\{x_{pmi}, y_{pmi}, z_{pmi}\}^T$ (referred to as "PX$_i$") of the measurement tip 306 and the center PC of the calibration artifact 240 and the distance R between the measurement tip 306 and the calibration artifact 240 have a distance error $f_i(E)$ as shown in Formulas (8) and (9). A moving amount $M_i$ of the measuring probe 300 and a probe output $P_i$, which are the i-th (1≤i≤n1) output, are denoted as $\{x_{mi}, y_{mi}, z_{mi}\}^T$ and $\{x_{pi}, y_{pi}, z_{pi}\}^T$, respectively. A variable E represents $\{B_{11}, B_{12}, B_{13}, B_{21}, B_{22}, B_{23}, B_{31}, B_{32}, B_{33}, x_c, y_c, z_c, R\}^T$.

$$f_i(E) = |PXi - PC| - R \qquad \text{Formula (8)}$$

$$f_i(E) = \left| \left\{\begin{array}{c} x_{mi} \\ y_{mi} \\ z_{mi} \end{array}\right\} + \begin{bmatrix} B_{11} & B_{12} & B_{13} \\ B_{21} & B_{22} & B_{23} \\ B_{31} & B_{32} & B_{33} \end{bmatrix} \left\{\begin{array}{c} x_{pi} \\ y_{pi} \\ z_{pi} \end{array}\right\} - \left\{\begin{array}{c} x_c \\ y_c \\ z_c \end{array}\right\} \right| - R \qquad \text{Formula (9)}$$

Where
Center PXi of measurement tip 306:

$$\left\{\begin{array}{c} x_{pmi} \\ y_{pmi} \\ z_{pmi} \end{array}\right\} = \left\{\begin{array}{c} x_{mi} \\ y_{mi} \\ z_{mi} \end{array}\right\} + \begin{bmatrix} B_{11} & B_{12} & B_{13} \\ B_{21} & B_{22} & B_{23} \\ B_{31} & B_{32} & B_{33} \end{bmatrix} \left\{\begin{array}{c} x_{pi} \\ y_{pi} \\ z_{pi} \end{array}\right\}$$

Intermediate correction matrix $BB$: $\begin{bmatrix} B_{11} & B_{12} & B_{13} \\ B_{21} & B_{22} & B_{23} \\ B_{31} & B_{32} & B_{33} \end{bmatrix}$ Here, the intermediate correction matrix BB includes linear correction elements $B_{LE}$ for correcting linear coordinate components $x_p$, $y_p$, and $z_p$ of the probe output P with respect to the moving amount M of the measuring probe 300. The linear correction elements $B_{LE}$ refer to elements $B_{11}$, $B_{12}$, $B_{13}$, $B_{21}$, $B_{22}$, $B_{23}$, $B_{31}$, $B_{32}$, and $B_{33}$ by which the linear coordinate components $x_p$, $y_p$, and $z_p$ are multiplied. The number n1 is set to be larger than or equal to the number of the linear correction elements $B_{LE}$.

An evaluation function J(E) for evaluating the distance error $f_i(E)$ will now be shown in Formula (10)

$$J(E) = \sum_{i=1}^{n1} f_i^2(E) \qquad \text{Formula (10)}$$

More specifically, the matrix generation unit 408 can calculate the correction elements $B_{11}$, $B_{12}$, $B_{13}$, $B_{21}$, $B_{22}$, $B_{23}$, $B_{31}$, $B_{32}$, and $B_{33}$ of the intermediate correction matrix BB by calculating the variable E to minimize the evaluation function J(E) shown in Formula (10) by the non-linear least-squares method, for example. A general solution, such as the Levenberg-Marquardt method, can be employed in this calculation.

As shown in Formula (11), the matrix generation unit 408 generates a latter correction matrix EE by multiplying the former intermediate correction matrix DD generated in the matrix generation unit 408PR by the intermediate correction matrix BB.

Fomula (11)

$$[BB][DD] = [EE]$$

$$\begin{bmatrix} B_{11} & B_{12} & B_{13} \\ B_{21} & B_{22} & B_{23} \\ B_{31} & B_{32} & B_{33} \end{bmatrix} \begin{bmatrix} 1 & 0 & 0 & C_{14} & C_{15} & C_{16} & C_{17} & C_{18} & C_{19} & \dots \\ 0 & 1 & 0 & C_{24} & C_{25} & C_{26} & C_{27} & C_{28} & C_{29} & \dots \\ 0 & 0 & 1 & C_{34} & C_{35} & C_{36} & C_{37} & C_{38} & C_{39} & \dots \end{bmatrix} =$$

$$\begin{bmatrix} B_{11} & B_{12} & B_{13} & D_{14} & D_{15} & D_{16} & D_{17} & D_{18} & D_{19} & \dots \\ B_{21} & B_{22} & B_{23} & D_{24} & D_{25} & D_{26} & D_{27} & D_{28} & D_{29} & \dots \\ B_{31} & B_{32} & B_{33} & D_{34} & D_{35} & D_{36} & D_{37} & D_{38} & D_{39} & \dots \end{bmatrix}$$

The probe output correction unit 410 shown in FIG. 2 corrects the probe output P acquired by the coordinate acquisition unit 406 with the latter correction matrix EE (obtained on the basis of the intermediate correction matrix BB and the former intermediate correction matrix DD) outputted from the matrix generation unit 408. More specifically, the probe output correction unit 410 obtains a transformed output $\{x_{p\_m}, y_{p\_m}, z_{p\_m}\}^T$ (referred to as "PM") in the machine coordinate system by correcting the probe output P with the latter correction matrix EE as shown in Formula (12).

$$\{PM\} = [EE]\{P\} \qquad \text{Formula (12)}$$

$$\left\{\begin{array}{c} x_{p\_m} \\ y_{p\_m} \\ z_{p\_m} \end{array}\right\} =$$

$$\begin{bmatrix} B_{11} & B_{12} & B_{13} & D_{14} & D_{15} & D_{16} & D_{17} & D_{18} & D_{19} & \dots \\ B_{21} & B_{22} & B_{23} & D_{24} & D_{25} & D_{26} & D_{27} & D_{28} & D_{29} & \dots \\ B_{31} & B_{32} & B_{33} & D_{34} & D_{35} & D_{36} & D_{37} & D_{38} & D_{39} & \dots \end{bmatrix}$$

$$\left\{\begin{array}{c} x_p \\ y_p \\ z_p \\ x_p^2 \\ y_p^2 \\ z_p^2 \\ x_p y_p \\ x_p z_p \\ y_p z_p \\ \vdots \end{array}\right\}$$

In the latter correction matrix EE, linear correction elements $E_{LE}$ are elements $B_{11}$, $B_{12}$, $B_{13}$, . . . , and non-linear correction elements $E_{NLE}$ are elements $D_{14}$, $D_{15}$, . . . .

As shown in Formula (13), the shape coordinate computing unit 412 shown in FIG. 2 computes the shape coordinates XX of the object W to be measured by adding the transformed output PM supplied from the probe output correction unit 410 to the moving amount M of the measuring probe 300 acquired by the coordinate acquisition unit 406. The shape coordinate computing unit 412 can also obtain the center PC of the calibration artifact 240 from the moving amount M and the probe output P of the measuring probe 300 acquired by the coordinate acquisition unit 406.

$$\{XX\}=\{M\}+\{PM\} \qquad \text{Formula (13)}$$

The storage unit 414 shown in FIG. 2 stores initial values for various types of control, initial values for various types of processing, and programs, for example. The storage unit 414 also stores: the former correction matrix AA, the former linear correction matrix CC, and the former intermediate correction matrix DD obtained by the coordinate measuring machine 100PR as processed results in the processing device 400PR; and the intermediate correction matrix BB and the latter correction matrix EE generated by the matrix generation unit 408. In addition, the storage unit 414 also stores the center PC of the calibration artifact 240 obtained by the shape coordinate computing unit 412. Note that the storage unit 414 can also store CAD data on the object W to be measured or the calibration artifact 240, for example. At least the former intermediate correction matrix DD among the former correction matrix AA, the former linear correction matrix CC, and the former intermediate correction matrix DD is stored in the storage unit 414 via a storage medium or communication unit from the storage unit 414PR of the coordinate measuring machine 100PR.

Next, a general procedure of coordinate correction according to the present embodiment will be described below with reference to FIG. 8.

First, the former correction step is performed with the coordinate measuring machine 100PR (Step S2 in FIG. 8). The former correction step is performed to correct non-linear probe characteristics that cause a non-linear error of the measuring probe 300. The former correction step may be employed as a correction step performed prior to shipment of the measuring probe 300 from the factory, for example. The former correction step may, of course, be a correction step performed when the measuring probe 300 is calibrated by an end user.

Next, the latter correction step is performed with the coordinate measuring machine 100 (Step S4 in FIG. 8). The latter correction step can also correct a non-linear error, only with the number of measurements for correcting a linear error of the measuring probe 300. The latter correction step may be employed as a correction step performed immediately before an end user's measurement with the measuring probe 300, for example. If the former correction step is performed during a mid-course test at the factory, the latter correction step may, of course, be performed as correction conducted prior to the final shipment from the factory.

Next, the former correction step will be described below mainly with reference to FIG. 9.

First, the measuring probe 300PR is set in the drive mechanism 220PR of the coordinate measuring machine 100PR (Step S10 in FIG. 9).

Next, the restraining unit 240PR is fixed at a predetermined position on the surface plate 210PR in a measurement space. Thereafter, the measurement tip 306PR is moved by the drive mechanism 220PR to a space between the columnar parts 246A and the columnar parts 246B in the restraining unit 240PR. Thereafter, the measurement tip 306PR is sandwiched by the columnar parts 246A and the columnar parts 246B to restrain a translational displacement of the measurement tip 306PR (Step S12 in FIG. 9). At this time, the restraining unit 240PR sandwiches the measurement tip 306PR while abutting against the measurement tip 306PR with pressing force in a degree not to restrain rotational displacement of the center of the measurement tip 306PR as the center of rotation. Such pressing force can be stably controlled by incorporating, for example, pressure sensors (not shown) into the pressing members 242A and 242B.

Next, while keeping such a restrained state (state in which a translational displacement of the measurement tip 306PR is restrained by the restraining unit 240PR), the measuring probe 300PR is moved to a position at which the probe output Ppr is 0 by the driving of the drive mechanism 220PR. The position at which the probe output Ppr is 0 is set as the reference position Pb (in other words, the measuring probe 300PR is moved to the reference position Pb) (Step S14 in FIG. 9).

Next, while keeping the restrained state, the measuring probe 300PR is moved to a plurality of positions (identical with the number n of measurement points) in the measurement space by the drive mechanism 220PR in accordance with the drive control signal Dpr of the drive mechanism control unit 404PR. When the measuring probe 300PR is moved to each of the plurality of positions, the coordinate acquisition unit 406PR acquires the moving amount Mpr and the probe output Ppr at the time of the movement of the measuring probe 300PR from the reference position Pb to each of the measurement points (Step S16 in FIG. 9). In other words, while keeping the state in which the measurement tip 306PR is restrained by the restraining unit 240PR at the reference position Pb where the probe output is 0, the coordinate acquisition unit 406PR acquires the moving amount Mpr and the probe output Ppr at the time of the movement of the measuring probe 300PR from the reference position Pb to each of the measurement points. At this time, the number n of the measurement points is larger than or equal to the sum of the number of the linear correction elements $A_{LE}$ and the number of the non-linear correction elements $A_{NLE}$ in the former correction matrix AA. The measurement points are appropriately determined to cover all directions having a possibility of being displaced by the contact of the measurement tip 306PR at the time of the measurement of the object W to be measured.

Thereafter, the matrix generation unit 408PR generates the former correction matrix AA with the moving amount Mn and the probe output Pn of the measuring probe 300PR corresponding to the number n of the measurement points (Step S18 in FIG. 9). Thereafter, the matrix generation unit 408PR generates the former intermediate correction matrix DD by multiplying the former correction matrix AA by the inverse matrix of the former linear correction matrix CC including only the linear correction elements $A_{LE}$ of the former correction matrix AA (Step S19 in FIG. 9). The generated former correction matrix AA, former linear correction matrix CC, and former intermediate correction matrix DD are stored in the storage unit 414PR. At the same time, at least the former intermediate correction matrix DD among the former correction matrix AA, the former linear correction matrix CC, and the former intermediate correction matrix DD is stored in the storage unit 414 of the coordinate measuring machine 100 via a communication function (unit) or an external medium.

Next, the latter correction step will be described below mainly with reference to FIG. 10.

Figure 10:
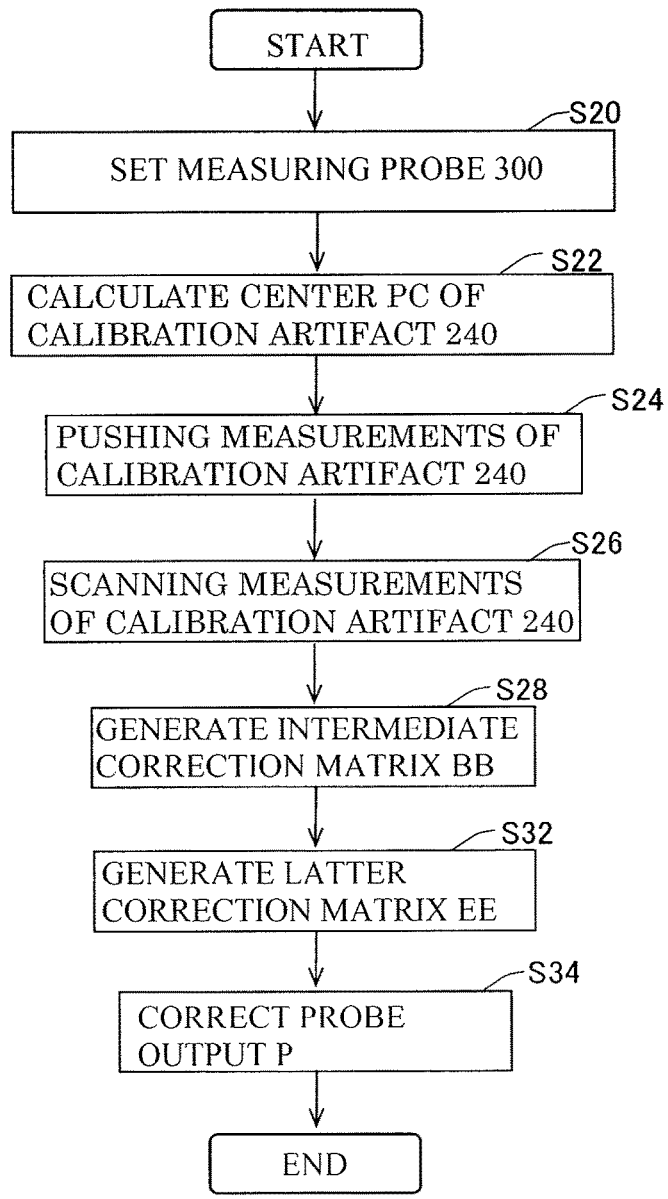
FIG. 10 is a flow chart showing an example of a procedure of a latter correction step of FIG. 8.

First, the measuring probe 300PR detached from the coordinate measuring machine 100PR is set in the drive mechanism 220 of the coordinate measuring machine 100 (Step S20 in FIG. 10). At this point, the measuring probe 300PR is regarded as the measuring probe 300. In other words, the stylus 304 may be identical with, or different from, the stylus 304PR. An attitude of the measuring probe 300 supported by the drive mechanism 220 may be identical with, or different from, that of the measuring probe 300PR.

Next, the calibration artifact 240 is fixed at a predetermined position on the surface plate 210 in a measurement space. Thereafter, the measurement tip 306 is brought into contact with the calibration artifact 240 to obtain the center PC of the calibration artifact 240 (Step S22 in FIG. 10). Specifically, the measuring probe 300 is moved by the drive mechanism control unit 404, and on the basis of the moving amount M and the probe output P of the measuring probe 300 acquired by the coordinate acquisition unit 406, the center PC of the calibration artifact 240 is obtained by the shape coordinate computing unit 412. The reason why the center PC of the calibration artifact 240 is obtained is to utilize such a nature that all normal lines to the surface of the calibration artifact 240 pass through the center PC of the calibration artifact 240. The center PC is stored in the storage unit 414.

Next, the moving amount M and the probe output P are acquired when a translational displacement of the measurement tip 306 is restrained and the measuring probe 300 is moved by the drive mechanism 220. Specifically, the pushing drive mechanism control unit 404A and the coordinate acquisition unit 406 first control the drive mechanism 220 to perform the pushing measurements in the pushing drive step of: bringing the measurement tip 306 into contact with the surface of the calibration artifact 240 at a single point in each of the five directions; pushing the calibration artifact 240 with the measurement tip 306 by a predetermined displacement amount; and then moving the measurement tip 306 in the opposite direction to separate the measurement tip 306 away from the surface (Step S24 in FIG. 10). A total of five directions, i.e., three directions perpendicular to one another and two directions among the three directions adding a respective inversed direction, are each set to be a normal direction to the surface of the calibration artifact 240. In other words, such five directions pass through the obtained center PC of the calibration artifact 240. A specific procedure of the pushing measurement will be described later.

Next, the scanning drive mechanism control unit 404B and the coordinate acquisition unit 406 control the drive mechanism 220 to perform the scanning measurements in the scanning drive step of reciprocating the measurement tip 306 on the surface of the calibration artifact 240 while pressing the calibration artifact 240 with the measurement tip 306 by a constant deflection amount on each of the three planes (Step S26 in FIG. 10). A route of this scanning measurement is generated in advance on the basis of the obtained center PC of the calibration artifact 240. Note that the three planes are perpendicular to one another. A specific procedure of the scanning measurement will also be described later.

Next, on the basis of the moving amounts M and the probe outputs P of the measuring probe 300 when the number of the measurement points obtained by the pushing measurements and the scanning measurements is n1, the matrix generation unit 408 generates the intermediate correction matrix BB including the linear correction elements $B_{LE}$ for correcting linear coordinate components of the probe output P (Step S28 in FIG. 10). Thereafter, the probe output P is corrected with the latter correction matrix EE generated on the basis of the intermediate correction matrix BB and the former intermediate correction matrix DD.

Specifically, the former intermediate correction matrix DD generated by multiplying the former correction matrix AA by the inverse matrix of the former linear correction matrix CC including only the linear correction elements $A_{LE}$ of the former correction matrix AA is first retrieved from the storage unit 414. The latter correction matrix EE is generated by multiplying the intermediate correction matrix BB by the former intermediate correction matrix DD in the matrix generation unit 408 (Step S32 in FIG. 10). In other words, the latter correction matrix EE is generated by using the former intermediate correction matrix DD, which is based on the intermediate correction matrix BB and the former correction matrix AA. Thereafter, the probe output P at the time of the measurement of the object W to be measured is corrected with the latter correction matrix EE in the probe output correction unit 410 to obtain the transformed output PM (Step S34 in FIG. 10). Thereafter, the shape coordinates XX are computed in the shape coordinate computing unit 412 by combining the moving amount M of the measuring probe 300 and the transformed output PM.

The procedure of the pushing measurements will now be described below with reference to FIGS. 11 to 13.

Figure 11:
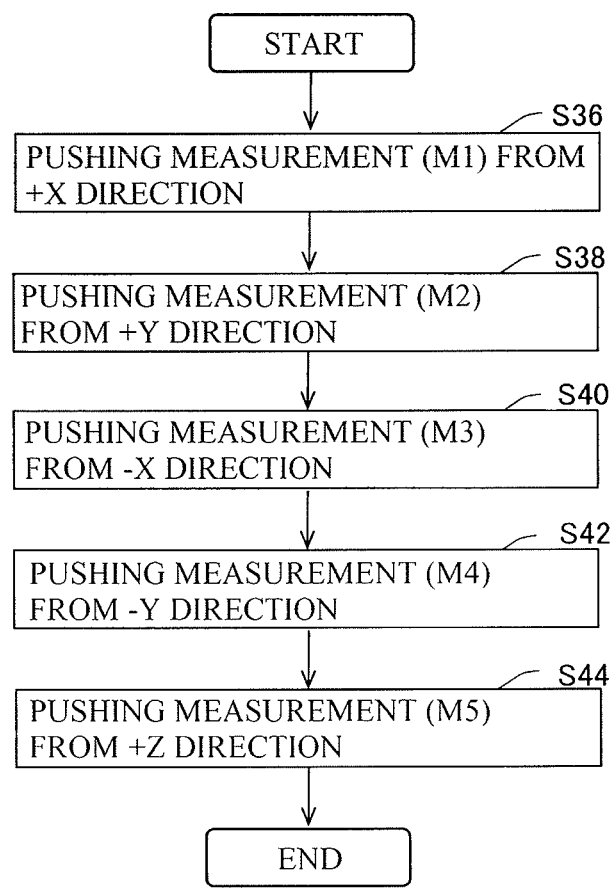
FIG. 11 is a flow chart showing the order of pushing measurements of FIG. 10.
Figure 12B:
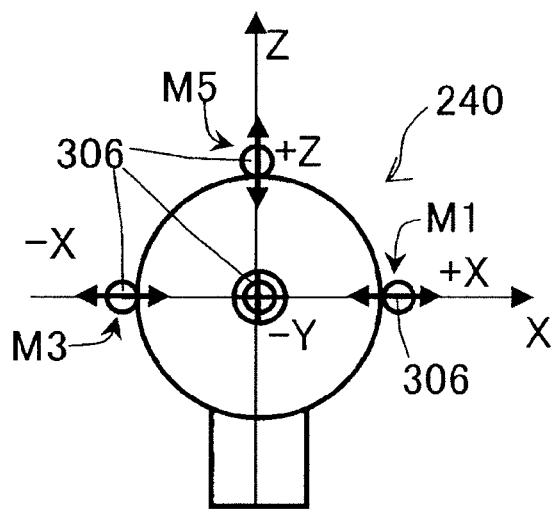
FIG. 12B is a side view showing the positional relationships between the measurement tip and the calibration artifact when the pushing measurements of FIG. 11 are performed.

First, a pushing measurement (M1) is performed against the surface of the calibration artifact 240 in the +X direction (Step S36 in FIG. 11) as shown in FIGS. 12A and 12B. Thereafter, a pushing measurement (M2) is performed against the surface of the calibration artifact 240 in the +Y direction (Step S38 in FIG. 11).

Next, as shown in FIGS. 12A and 12B, a pushing measurement (M3) is performed against the surface of the calibration artifact 240 in the −X direction (which has a measurement force opposite to that of the X direction) (Step S40 in FIG. 11). Thereafter, a pushing measurement (M4) is performed against the surface of the calibration artifact 240 in the −Y direction (which has a measurement force opposite to that of the Y direction) (Step S42 in FIG. 11).

Next, a series of the pushing measurements is completed by performing a pushing measurement (M5) against the surface of the calibration artifact 240 in the +Z direction as shown in FIGS. 12A and 12B (Step S44 in FIG. 11).

A specific procedure of performing the pushing measurement (M1) against the surface of the calibration artifact 240 in the +X direction will now be described below with reference to FIG. 13. Procedures of the pushing measurements performed against the side surfaces of the calibration artifact 240 in directions other than the +X direction are identical with the following procedure except for the directions and the side surfaces of the calibration artifact 240. A description thereof will be therefore omitted.

First, in accordance with the output (the drive control signal D) of the pushing drive mechanism control unit 404A, the drive mechanism 220 moves the measuring probe 300 in the −X direction toward the center PC of the calibration artifact 240. More specifically, the pushing drive mechanism control unit 404A moves the measurement tip 306 to approach the −X direction from the normal direction to the surface of the calibration artifact 240 in the +X direction (Step S46 in FIG. 13). Thereafter, it is checked if the measurement tip 306 is in contact with the calibration artifact 240 (Step S48 in FIG. 13). Whether the measurement tip 306 is in contact with the calibration artifact 240 is determined on the basis of whether the probe output P has a change (exceeding a noise level) in the coordinate acquisition unit 406, for example. When the measurement tip 306 is not in contact with the calibration artifact 240 (No in Step S48 in FIG. 13), the movement of the measuring probe 300 in the −X direction toward the center PC of the calibration artifact 240 is continued to move the measurement tip 306 further in the −X direction. Note that whether the measurement tip 306 is in contact with the calibration artifact 240 may be checked by: calculating coordinates of the surface of the calibration artifact 240 in the +X direction with an initial setting value of the distance R between the measurement tip 306 and the calibration artifact 240 and the center PC of the calibration artifact 240, which are stored in the storage unit 414; and then comparing the coordinates with the command from the command unit 402 by the pushing drive mechanism control unit 404A. Alternatively, whether the measurement tip 306 is in contact with the calibration artifact 240 may be checked by comparing the initial setting value stored in the storage unit 414 with the moving amount M of the measuring probe 300 in the machine coordinate system, which is outputted from the drive mechanism 220, by the pushing drive mechanism control unit 404A.

Figure 13:
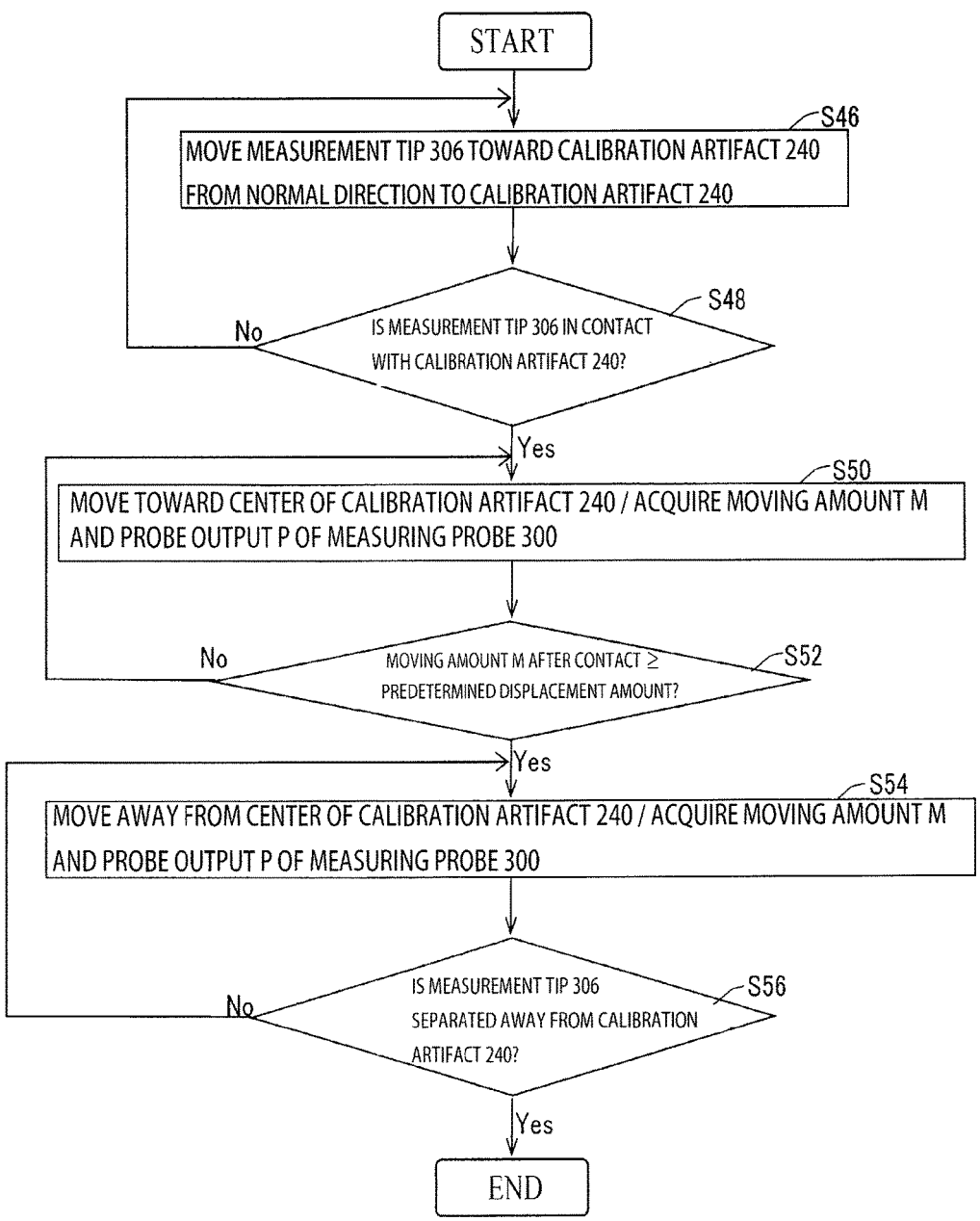
FIG. 13 is a flow chart showing a procedure of a pushing measurement of FIG. 11 in one direction.

When the measurement tip 306 is in contact with the calibration artifact 240 (Yes in Step S48 in FIG. 13), the coordinate acquisition unit 406 starts to acquire the moving amount M and the probe output P of the measuring probe 300 (Step S50 in FIG. 13). Note that the movement of the measuring probe 300 by the drive mechanism 220 in the −X direction toward the center PC of the calibration artifact 240 is still continued.

Next, it is checked if the moving amount M of the measuring probe 300 after the contact is larger than or equal to the predetermined displacement amount in the coordinate acquisition unit 406 (Step S52 in FIG. 13). When the moving amount M of the measuring probe 300 after the contact is smaller than the predetermined displacement amount (No in Step S52 in FIG. 13), the movement of the measuring probe 300 by the drive mechanism 220 in the −X direction toward the center PC of the calibration artifact 240 is still continued. Note that whether the moving amount M of the measuring probe 300 after the contact is larger than or equal to the predetermined displacement amount may be checked on the basis of a predetermined deflection amount in the probe output P, which corresponds to the predetermined displacement amount. Alternatively, whether the moving amount of the measuring probe 300 after the contact is larger than or equal to the predetermined displacement amount may be checked by: calculating coordinates of the surface of the calibration artifact 240 in the +X direction with the initial setting value of the distance R between the measurement tip 306 and the calibration artifact 240 and the center PC of the calibration artifact 240, which are stored in the storage unit 414; and then comparing coordinates obtained by subtracting the predetermined displacement amount in the −X direction from the calculated coordinates with the command from the command unit 402 by the pushing drive mechanism control unit 404A. Note that the predetermined displacement amount is set to be larger than the expected deflection amount in the probe output P at the time of the measurement of the object W to be measured.

When the moving amount M of the measuring probe 300 after the contact becomes larger than or equal to the predetermined displacement amount (Yes in Step S52 in FIG. 13), the pushing drive mechanism control unit 404A stops the movement of the measuring probe 300 in the −X direction toward the center PC of the calibration artifact 240. Thereafter, the pushing drive mechanism control unit 404A starts to move the measuring probe 300 in a direction opposite to the −X direction (i.e., the +X direction away from the center PC of the calibration artifact 240) (Step S54 in FIG. 13). Note that the acquisition of the moving amount M and the probe output P of the measuring probe 300 is continued.

Next, it is checked if the measurement tip 306 is separated away from the calibration artifact 240 (Step S56 in FIG. 13). Whether such separation has occurred is determined on the basis of whether the probe output P no longer has a change (exceeding the noise level) in the coordinate acquisition unit 406, for example. When the measurement tip 306 is in contact with the calibration artifact 240 (No in Step S56 in FIG. 13), the movement of the measuring probe 300 in the +X direction away from the center PC of the calibration artifact 240 is continued. Whether the measurement tip 306 is separated away from the calibration artifact 240 may be checked by: calculating coordinates of the surface of the calibration artifact 240 in the +X direction with the initial setting value of the distance R between the measurement tip 306 and the calibration artifact 240 and the center PC of the calibration artifact 240, which are stored in the storage unit 414; and then comparing the calculated coordinates with the command from the command unit 402 by the pushing drive mechanism control unit 404A. Alternatively, whether the measurement tip 306 is separated away from the calibration artifact 240 may be checked by comparing the initial setting value stored in the storage unit 414 with the moving amount M of the measuring probe 300 in the machine coordinate system, which is outputted from the drive mechanism 220, by the pushing drive mechanism control unit 404A.

When the measurement tip 306 is separated away from the calibration artifact 240 (Yes in Step S56 in FIG. 13), the acquisition of the moving amount M and the probe output P of the measuring probe 300 is stopped. The pushing measurement (M1) of the measurement tip 306 from the +X direction is thus ended.

Next, the procedure of the scanning measurements will be described below with reference to FIGS. 14, 15A, and 15B.

Figure 14:
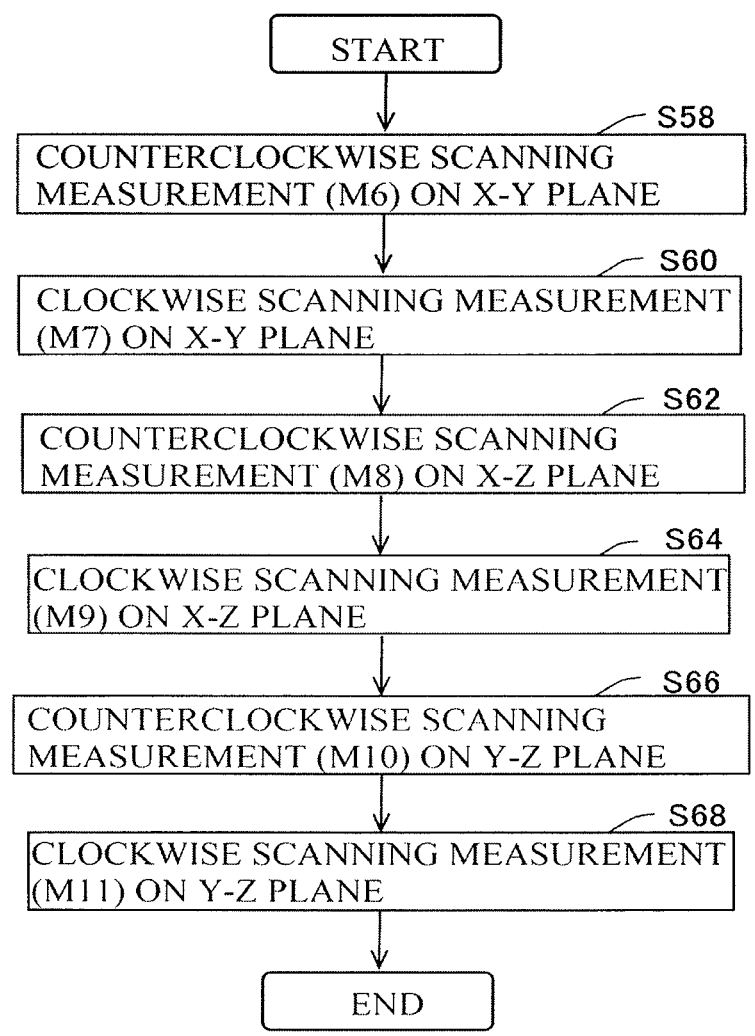
FIG. 14 is a flow chart showing the order of scanning measurements in FIG. 10.

First, a scanning measurement (M6) is performed counterclockwise on the X-Y plane by bringing the measurement tip 306 into contact with the surface of the calibration artifact 240 with a constant deflection amount in the probe output P as shown in FIGS. 15A and 15B (Step S58 in FIG. 14). Thereafter, while keeping the constant deflection amount, a scanning measurement (M7) is performed clockwise on the X-Y plane (Step S60 in FIG. 14). A larger angular range over which such a scanning measurement is performed is more preferred. On the X-Y plane, such an angular range can be set to 360 degrees. Note that the constant deflection amount herein refers to an average deflection amount in the probe output P, which is expected at the time of the measurement of the object W to be measured (the same applies hereinafter).

Next, a scanning measurement (M8) is performed counterclockwise on the X-Z plane by bringing the measurement tip 306 into contact with the surface of the calibration artifact 240 with the same constant deflection amount as shown in FIGS. 15A and 15B (Step S62 in FIG. 14). Thereafter, while keeping the constant deflection amount, a scanning measurement (M9) is performed clockwise on the X-Z plane (Step S64 in FIG. 14). Similarly, a larger angular range over which such a scanning measurement is performed is more preferred. In reality, however, the angular range can be, at most, of about 180 degrees on the X-Z plane (the same applies to the Y-Z plane).

Next, a scanning measurement (M10) is performed counterclockwise on the Y-Z plane by bringing the measurement tip 306 into contact with the surface of the calibration artifact 240 with the same constant deflection amount as shown in FIGS. 15A and 15B (Step S66 in FIG. 14). Thereafter, a series of the scanning measurements is ended by performing a scanning measurement (M11) clockwise on the Y-Z plane while keeping the constant deflection amount (Step S68 in FIG. 14).

As described above, according to the present embodiment, the non-linear correction elements $E_{NLE}$ for correcting non-linear coordinate components (corresponding to those other than the linear coordinate components) in the latter correction matrix EE are obtained on the basis of the non-linear correction elements $A_{NLE}$ (the non-linear correction elements $D_{NLE}$ in the former intermediate correction matrix DD) in the former correction matrix AA obtained in the former correction step performed in the coordinate measuring machine 100PR. In the latter correction step performed in the coordinate measuring machine 100, the moving amount M and the probe output P of the measuring probe 300 for generating the intermediate correction matrix BB including only the linear correction elements $B_{LE}$ are measured in order to obtain the non-linear correction elements $E_{NLE}$. In other words, without increasing the number of steps and complicating the configuration for the coordinate correction performed in the coordinate measuring machine 100 as compared to a case where a linear error of the probe output P is corrected, the coordinate measuring machine 100 can also correct a non-linear error of the probe output P. Examples of such a non-linear error include an error caused when a spring structure in a member for movably supporting the stylus 304 in the measuring probe 300 has a non-linear spring constant and an error caused when not only the spring structure but also the probe sensor respond non-linearly.

According to the present embodiment, even the former intermediate correction matrix DD is generated in the former correction step on the basis of the former correction matrix AA. Thus, the present embodiment can reduce an amount of computation in the latter correction step as compared to a case where the former intermediate correction matrix DD is obtained in the latter correction step on the basis of the former correction matrix AA. Note that the present invention is not limited thereto. For example, the former intermediate correction matrix DD may be obtained in the latter correction step.

According to the present embodiment, the step of restraining a translational displacement of the measurement tip 306PR in the former correction step is described as the step of restraining a translational displacement of the measurement tip 306PR at the reference position Pb where the displacement of the measurement tip 306PR is 0, and not-restraining rotational displacement of the center of the measurement tip 306PR as the center of rotation. The step of acquiring the moving amount Mpr and the probe output Ppr when the measuring probe 300PR is moved by the drive mechanism 220PR is described as the step of acquiring the moving amount Mpr and the probe output Ppr at the time of the movement of the measuring probe 300PR from the reference position Pb to each of the measurement points. This can clarify the probe output Ppr with respect to the moving amount Mpr of the measuring probe 300PR. Consequently, the measurement unit can be simplified and the measurement time can be shortened. Thus, the former correction matrix AA can be generated with high accuracy with simpler computation. Note that the present invention is not limited thereto. For example, the position at which a translational displacement of the measurement tip 306PR is restrained may deviate from the reference position Pb at which the displacement of the measurement tip 306PR is 0. Alternatively, a rotational displacement of the center of the measurement tip 306PR as the center of rotation may be restrained suitably. The respective acquisition of the moving amount Mpr and the probe output Ppr may be performed without using the reference position Pb as a reference.

According to the present embodiment, the step of restraining a translational displacement of the measurement tip 306 in the latter correction step is described as the step of bringing the measurement tip 306 into contact with the calibration artifact 240. The step of acquiring the moving amount M and the probe output P when the measuring probe 300 is moved by the drive mechanism 220 includes: the pushing drive step of bringing the measurement tip 306 into contact with the surface of the calibration artifact 240 at a single point in a normal direction to the surface of the calibration artifact 240, pushing the calibration artifact 240 with the measurement tip 306 by a predetermined displacement amount, and then moving the measurement tip 306 in the opposite direction to separate the measurement tip 306 away from the surface; and the scanning drive step of reciprocating the measurement tip 306 on the surface of the calibration artifact 240 while pressing the calibration artifact 240 with the measurement tip 306 by a constant deflection amount. In other words, the moving amount M and the probe output P for generating the intermediate correction matrix BB are acquired in both the pushing drive step and the scanning drive step. Thus, as compared to a case where the intermediate correction matrix BB is generated by acquiring the moving amount M and the probe output P only in one of these drive steps, the coordinate correction required in the actual scanning measurement of the measuring probe 300 can be performed more accurately. Furthermore, due to the reciprocating movement of the measurement tip 306 in this scanning drive, coordinate correction compensating for the influence of frictional force can be performed. Note that the present invention is not limited thereto. For example, only the pushing drive step or the scanning drive step may be performed. In fact, drive steps other than the pushing drive step and the scanning drive step of the measuring probe 300 having the above-described procedures may be employed.

According to the present embodiment, the normal directions to the surface of the calibration artifact 240 are described as a total of five directions, i.e., three directions perpendicular to one another and two directions among the three directions adding a respective inversed direction. In each of these directions, the pushing drive step is performed. More specifically, according to the present embodiment, the total of five directions includes: the Z direction corresponding to the axial direction O of the stylus 304; the +X direction and the −X direction in the X direction; and the +Y direction and the −Y direction in the Y direction. Therefore, even when asymmetric probe characteristics are exhibited on the X-Y plane, coordinate correction can be performed so that symmetric probe characteristics are exhibited between the plus side and the minus side of the origin of the stylus 304 on the X-Y plane.

According to the present embodiment, the measurement tip 306 pushes by the constant deflection amount on each of the three planes perpendicular to one another in the scanning drive step. Thus, in the actual scanning measurement of the measuring probe 300, the coordinate correction can be performed evenly among the three directions perpendicular to one another. Note that the present invention is not limited thereto. For example, the scanning drive step may be performed on each of three planes that are not perpendicular to one another. Alternatively, the number of planes on which the scanning drive step is performed may be larger than or smaller than three.

The moving amount M and the probe output P of the measuring probe 300, which are the results of the pushing measurement and the scanning measurement, are corrected with the former intermediate correction matrix DD. Thereafter, the latter correction matrix EE may be generated by generating the intermediate correction matrix BB and multiplying the former intermediate correction matrix DD by the generated intermediate correction matrix BB. In this case, the latter correction matrix EE capable of performing coordinate correction more accurately can be generated.

In other words, according to the present embodiment, the coordinate correction immediately before measurement can be simplified while allowing for the correction of a non-linear error of the probe output P supplied from the measuring probe 300.

For example, assume a case where the coordinate measuring machine 100PR is a master machine at a factory for manufacturing the measuring probe 300 and the coordinate measuring machine 100 and the coordinate measuring machine 100 is a user's machine for measuring the object W to be measured. More specifically, the former correction step is performed prior to the shipment of the measuring probe 300PR from the manufacturing factory, and the user performs measurement for generating the intermediate correction matrix BB with the probe body 302 of the measuring probe 300PR. At this time, the user can achieve more accurate coordinate correction by using the result (such as the former correction matrix AA) obtained in the former correction step as compared to a case where the user performs coordinate correction by using the measurement result obtained solely by the user. Such an advantageous effect can be similarly obtained also when only the user or the manufacturing factory is equipped with the coordinate measuring machines 100 and 100PR, for example. An example of such a case is when the former correction step is performed in a certain department for correcting the measuring probe 300PR with high accuracy, and the latter correction step is performed, for example, in each of departments for manufacturing, using, and selling the measuring probe 300. Alternatively, the coordinate measuring machines 100PR and 100 may be identical to each other. For example, the former correction step may be performed when the measuring probe 300PR is attached, and only the latter correction step may be performed at the time of actual measurement by the measuring probe 300.

While the present invention has been described with reference to the first embodiment, the present invention is not limited to the first embodiment. In other words, modifications and variations in design can be effected without departing from the scope of the present invention.

For example, the present invention may be configured as in a second embodiment shown in FIGS. 16 to 18B. In the following description, already-described elements will be denoted by the same reference numerals as in the first embodiment, and the description thereof will be omitted.

The second embodiment takes into account different forms of measuring probes 300PR and 300 in a larger degree than in the above-described embodiment. Specifically, the different forms of the measuring probes 300PR and 300 mean that the measuring probe 300PR has a plurality of different styluses 304PR that can be attached thereto or the measuring probe 300PR has a plurality of different attitudes, for example. In the present embodiment, in particular, the number of different forms of the measuring probe 300PR is based on the number L of different forms of the stylus 304PR, and forms of the measuring probe 300 are based on forms (different lengths in this embodiment) of a stylus 304. In such a case, configurations and functions different from those in the first embodiment will be described below.

As with the first embodiment, a processing device 400PR of a coordinate measuring machine 100PR in the present embodiment includes: a command unit 402PR; a drive mechanism control unit 404PR; a coordinate acquisition unit 406PR; a matrix generation unit 408PR; a probe output correction unit 410PR; a shape coordinate computing unit 412PR; and a storage unit 414PR as shown in FIG. 5. Since no probe output correction unit 410PR and shape coordinate computing unit 412PR are used also in the present embodiment, the processing device 400PR may not include these units.

As with the first embodiment, the command unit 402PR gives a wide variety of predetermined commands to the drive mechanism control unit 404PR and the like on the basis of commands inputted by operation unit 110PR or input unit 120PR. In addition, the command unit 402PR is configured to give the wide variety of predetermined commands to the drive mechanism control unit 404PR and the like corresponding to the different forms of the stylus 304PR.

As with the first embodiment, the matrix generation unit 408PR generates a former correction matrix AA by using outputs (a moving amount Mn and a probe output Pn of the measuring probe 300PR) of the coordinate acquisition unit 406PR. Thereafter, as shown in Formula (7), the matrix generation unit 408PR generates a former intermediate correction matrix DD by multiplying the former correction matrix AA by an inverse matrix of a former linear correction matrix CC including only linear correction elements $A_{LE}$ of the former correction matrix AA. At this time, the matrix generation unit 408PR generates a plurality of former intermediate correction matrixes DD corresponding to the number L of the different forms of the stylus 304PR. Thereafter, on the basis of the plurality of former intermediate correction matrixes DD, the matrix generation unit 408PR generates a correlation CR between the linear correction elements $A_{LE}$ or forms $L_{ST}$ of the stylus 304PR and non-linear correction elements $D_{NLE}$ (of the former intermediate correction matrix DD). Such a correlation CR obtains the non-linear correction element $D_{NLE}$ with a correlation function $CR(A_{LE})$ shown in FIG. 18A wherein the linear correction element $A_{LE}$ is a variable or with a correlation function $CR(L_{ST})$ shown in FIG. 18B wherein the different form $L_{ST}$ of the stylus 304PR is a variable (note that hollow circles on the correlation function $CR(A_{LE})$ and on the correlation function $CR(L_{ST})$ indicate values actually obtained by computation in the plurality of former correction matrixes AA (former intermediate correction matrixes DD)). The correlation function $CR(A_{LE})$ or the correlation function $CR(L_{ST})$ is stored in the storage unit 414PR and also in a storage unit 414 of a coordinate measuring machine 100 as a processed result in the processing device 400PR based on the former correction matrix AA. Note that the correlation CR may take not the form of a function but the form of a look-up table.

As with the first embodiment, a processing device 400 of the coordinate measuring machine 100 in the present embodiment includes: a command unit 402; a drive mechanism control unit 404; a coordinate acquisition unit 406; a matrix generation unit 408; a probe output correction unit 410; a shape coordinate computing unit 412; and the storage unit 414 as shown in FIG. 2.

As with the first embodiment, the matrix generation unit 408 generates an intermediate correction matrix BB with outputs (a moving amount M and a probe output P of the measuring probe 300) of the coordinate acquisition unit 406. The matrix generation unit 408 also obtains the non-linear correction elements $D_{NLE}$ corresponding to linear correction elements $B_{LE}$ of the intermediate correction matrix BB, instead of the linear correction elements $A_{LE}$ of the former correction matrix AA, or corresponding to forms $L_{SM}$ of the stylus 304, instead of the forms $L_{ST}$ of the stylus 304PR, with the correlation CR. Thereafter, the matrix generation unit 408 generates a latter correction matrix EE on basis of the linear correction elements $B_{LE}$ and the non-linear correction elements $D_{NLE}$ as shown below.

Latter correction matrix *EE*:

$$\begin{bmatrix} B_{11} & B_{12} & B_{13} \\ B_{21} & B_{22} & B_{23} \\ B_{31} & B_{32} & B_{33} \end{bmatrix} \begin{bmatrix} 1 & 0 & 0 & C_{14} & C_{15} & C_{16} & C_{17} & C_{18} & C_{19} & \ldots \\ 0 & 1 & 0 & C_{24} & C_{25} & C_{26} & C_{27} & C_{28} & C_{29} & \ldots \\ 0 & 0 & 1 & C_{34} & C_{35} & C_{36} & C_{37} & C_{38} & C_{39} & \ldots \end{bmatrix} =$$
$$\begin{bmatrix} B_{11} & B_{12} & B_{13} & D_{14} & D_{15} & D_{16} & D_{17} & D_{18} & D_{19} & \ldots \\ B_{21} & B_{22} & B_{23} & D_{24} & D_{25} & D_{26} & D_{27} & D_{28} & D_{29} & \ldots \\ B_{31} & B_{32} & B_{33} & D_{34} & D_{35} & D_{36} & D_{37} & D_{38} & D_{39} & \ldots \end{bmatrix}$$

Here, the non-linear correction elements $D_{NLE}$ (elements $C_{14}, C_{15}, C_{16}, \ldots$) in the former intermediate correction matrix DD are obtained from the correlation function $CR(A_{LE})$ or $CR(L_{ST})$. In other words, the non-linear correction elements $D_{NLE}$(elements $C_{14}, C_{15}, C_{16}, \ldots$) in the former intermediate correction matrix DD are not necessarily identical with the values (elements $C_{14}, C_{15}, C_{16}, \ldots$) actually obtained by computation in the plurality of former intermediate correction matrixes DD.

Next, a procedure of coordinate correction according to the present embodiment will be described below. The overall procedure of the coordinate correction is the same as that in the first embodiment shown in FIG. 8, and the description thereof will be therefore omitted. Each of a former correction step and a latter correction step will now be described.

First, the former correction step will be described below mainly with reference to FIG. 16.

Figure 16:
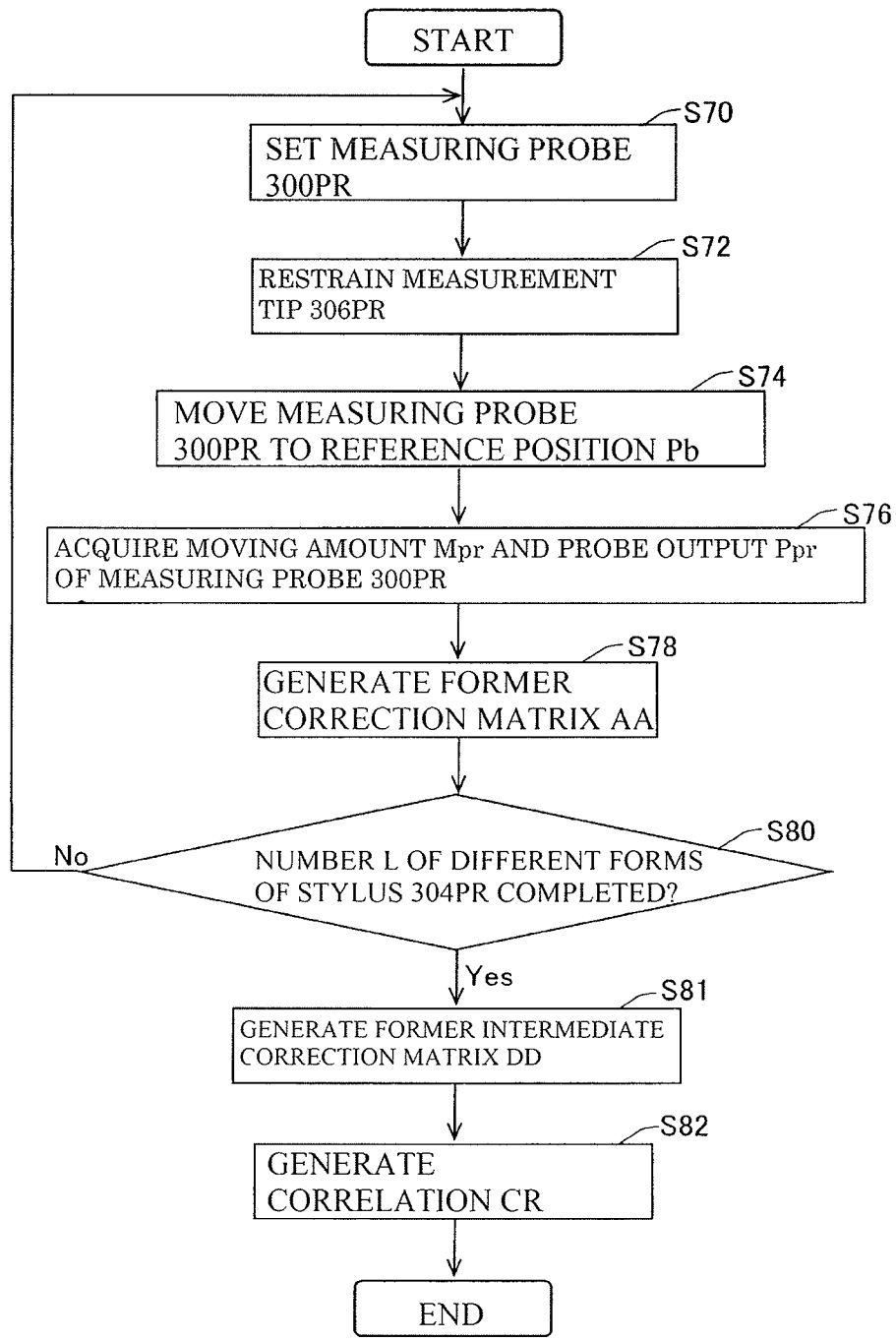
FIG. 16 is a flow chart showing an example of a procedure of a former correction step according to a second embodiment of the present invention.

First, the measuring probe 300PR is set in a drive mechanism 220PR of the coordinate measuring machine 100PR (Step S70 in FIG. 16).

Next, restraining unit 240PR is fixed at a predetermined position on a surface plate 210PR in a measurement space. Thereafter, a measurement tip 306PR is sandwiched by columnar parts 246A and columnar parts 246B of the restraining unit 240PR to restrain a translational displacement of the measurement tip 306PR (Step S72 in FIG. 16). Next, the measuring probe 300PR is moved to a reference position Pb (Step S74 in FIG. 16).

Next, while keeping such a restrained state, the measuring probe 300PR is moved to a plurality of positions in the measurement space by the drive mechanism 220PR in accordance with a drive control signal Dpr of the drive mechanism control unit 404PR. When the measuring probe 300PR is moved to each of the plurality of positions, the coordinate acquisition unit 406PR acquires a moving amount Mpr and a probe output Ppr at the time of movement of the measuring probe 300PR from the reference position Pb to each of the measurement points (Step S76 in FIG. 16).

Next, the matrix generation unit 408PR generates the former correction matrix AA with the moving amount Mn and the probe output Pn of the measuring probe 300PR corresponding to the number n of measurement points (Step S78 in FIG. 16). The former correction matrix AA is stored in the storage unit 414PR.

Thereafter, the matrix generation unit 408PR determines if the former correction matrixes AA completely corresponding to the number L of the different forms of the stylus 304PR have been generated (Step S80 in FIG. 16). When the generation of the former correction matrixes AA completely corresponding to the number L of the different forms of the stylus 304PR has not been finished yet (No in Step S80 in FIG. 16), the form of the stylus 304PR is changed corresponding to the number L of the different forms of the stylus 304PR and the steps from the step of setting the measuring probe 300PR in the drive mechanism 220PR (Step S70 in FIG. 16) through the step of generating the former correction matrix AA (Step S78 in FIG. 16) are repeated.

When the generation of the former correction matrixes AA completely corresponding to the number L of the different forms of the stylus 304PR has been finished (Yes in Step S80 in FIG. 16), the matrix generation unit 408PR generates the former intermediate correction matrix DD by multiplying the former correction matrix AA by the inverse matrix of the former linear correction matrix CC including only the linear correction elements $A_{LE}$ of the former correction matrix AA (Step S81 in FIG. 16). On the basis of the generated former intermediate correction matrixes DD, the correlation CR between the linear correction elements $A_{LE}$ or the forms $L_{ST}$ of the stylus 304PR and the non-linear correction elements $D_{NLE}$ is generated (Step S82 in FIG. 16). The correlation CR is stored in the storage unit 414PR. At the same time, the correlation CR is stored in the storage unit 414 of the coordinate measuring machine 100 via a communication function or an external medium together with the former intermediate correction matrixes DD and the like.

Next, the latter correction step will be described below mainly with reference to FIG. 17.

Figure 17:
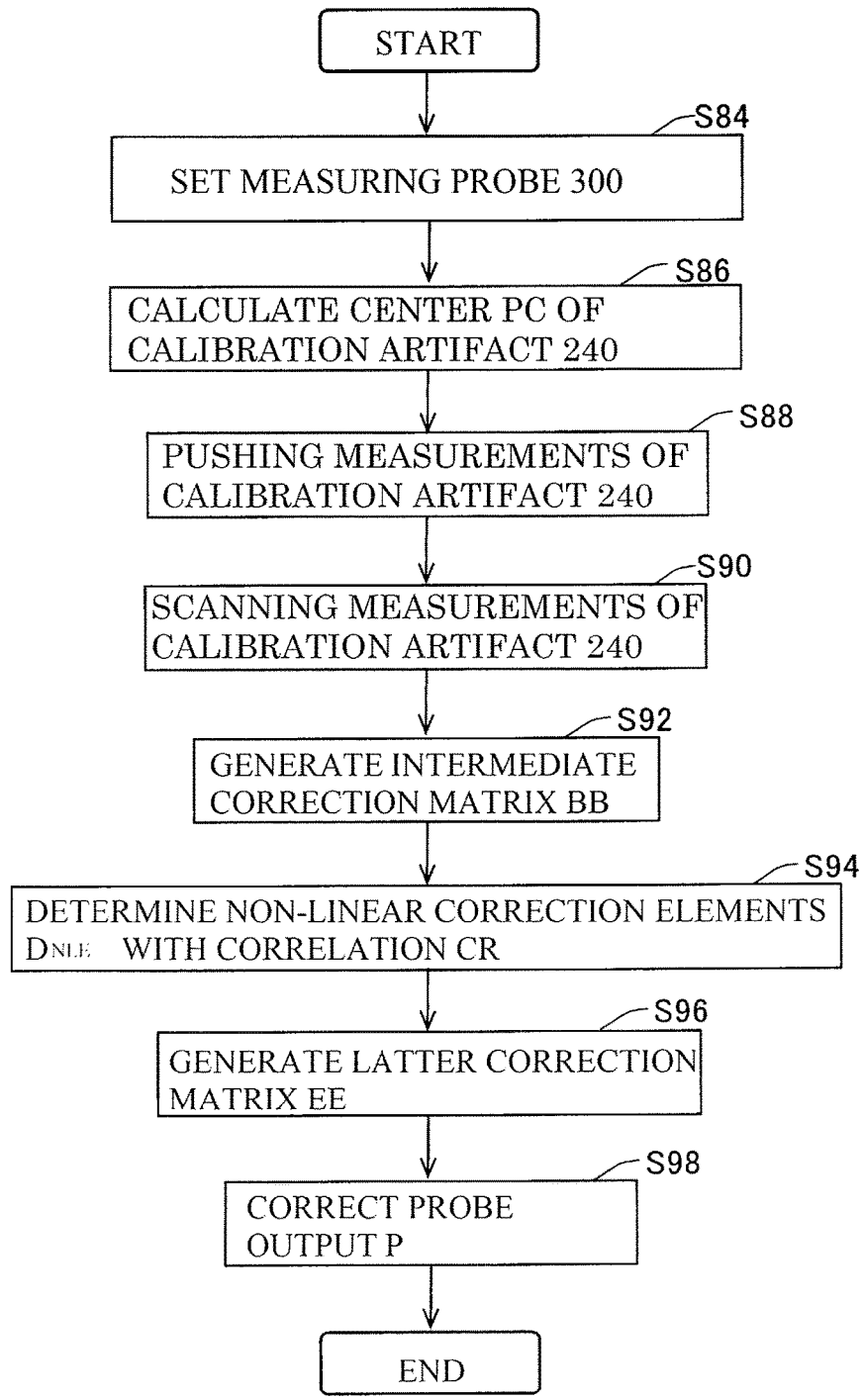
FIG. 17 is a flow chart showing an example of a procedure of a latter correction step according to the second embodiment of the present invention.
Figure 18A:
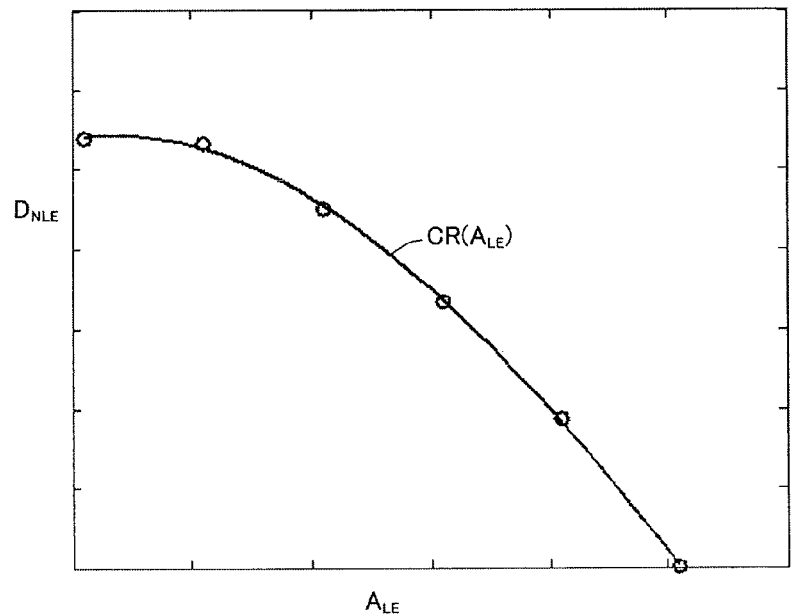
FIG. 18A is a graph showing an example of a correlation between linear correction elements and non-linear correction elements according to the second embodiment of the present invention.
Figure 18B:
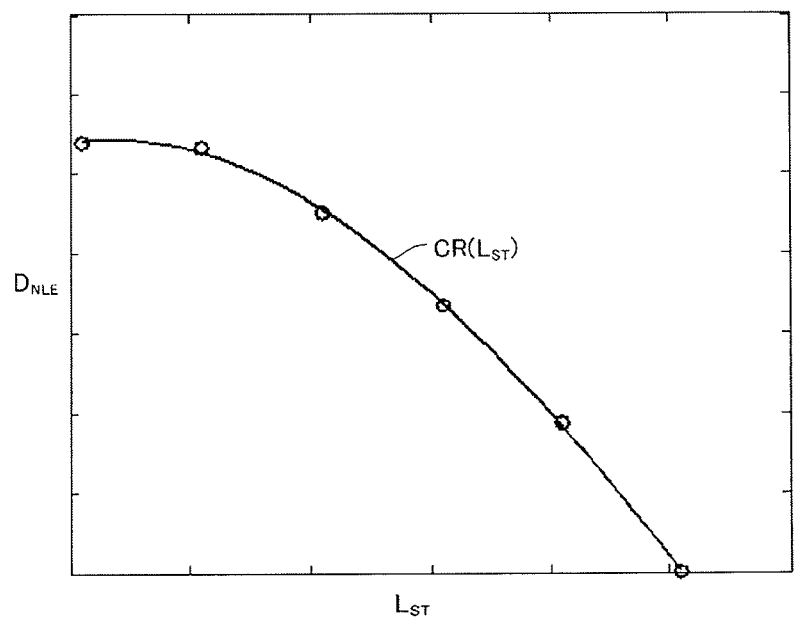
FIG. 18B is a graph showing an example of a correlation between different forms of a stylus and the non-linear correction elements according to the second embodiment of the present invention.

First, the measuring probe 300PR detached from the coordinate measuring machine 100PR is set in a drive mechanism 220 of the coordinate measuring machine 100 (Step S84 in FIG. 17). At this point, the measuring probe 300 is prepared by removing the stylus 304PR from the measuring probe 300PR and attaching the stylus 304 used to measure an object W to be measured, for example, to a probe body 302.

Next, a calibration artifact 240 is fixed at a predetermined position on a surface plate 210 in a measurement space. Thereafter, a measurement tip 306 is brought into contact with the calibration artifact 240 to obtain a center PC of the calibration artifact 240 (Step S86 in FIG. 17). The center PC is stored in the storage unit 414.

Next, the moving amount M and the probe output P are acquired when a translational displacement of the measurement tip 306 is restrained and the measuring probe 300 is moved by the drive mechanism 220. Specifically, a pushing drive mechanism control unit 404A and the coordinate acquisition unit 406 first perform pushing measurements of the calibration artifact 240 (Step S88 in FIG. 17). The details of the pushing measurements are the same as those in the first embodiment, and the description thereof will be therefore omitted. Next, a scanning drive mechanism control unit 404B and the coordinate acquisition unit 406 perform scanning measurements of the calibration artifact 240 (Step S90 in FIG. 17). The details of the scanning measurements are also the same as those in the first embodiment, and the description thereof will be therefore omitted.

Next, on the basis of the moving amounts M and the probe outputs P of the measuring probe 300 when the number of measurement points obtained by the pushing measurements and the scanning measurements is n1, the matrix generation unit 408 generates the intermediate correction matrix BB (Step S92 in FIG. 17). Thereafter, the probe output P is corrected with the latter correction matrix EE generated on the basis of the intermediate correction matrix BB and the correlation CR, which is based on the former correction matrix AA.

Specifically, the non-linear correction elements $D_{NLE}$ corresponding to the linear correction elements $B_{LE}$, instead of the linear correction elements $A_{LE}$, or corresponding to the forms $L_{SM}$ of the stylus 304, instead of the forms $L_{ST}$ of the stylus 304PR, are first obtained by the matrix generation unit 408 with the correlation CR stored in the storage unit 414 to determine all of the non-linear correction elements $D_{NLE}$ in the former intermediate correction matrix DD (Step S94 in FIG. 17). Thereafter, the matrix generation unit 408 generates the latter correction matrix EE with the linear correction elements $B_{LE}$ and the non-linear correction elements $D_{NLE}$ (Step S96 in FIG. 17). Thereafter, the probe output P at the time of the measurement of the object W to be measured is corrected with the latter correction matrix EE in the probe output correction unit 410 to obtain a transformed output PM (Step S98 in FIG. 17). Thereafter, the shape coordinates XX are computed in the shape coordinate computing unit 412 by combining the moving amount M of the measuring probe 300 and the transformed output PM.

The coordinate correction can be performed more accurately in the present embodiment than in the first embodiment because non-linear correction elements $E_{NLE}$ in the latter correction matrix EE are based on measurement for each of the different forms of the stylus 304PR. For example, a non-linear error caused by, or manifested by, differences in the length of the stylus 304 can be corrected.

After the former intermediate correction matrix DD is determined with the correlation CR, the moving amount M and the probe output P of the measuring probe 300, which are the results of the pushing measurement and the scanning measurement, are corrected with the former intermediate correction matrix DD. Thereafter, the intermediate correction matrix BB may be generated again, and the latter correction matrix EE may be generated by multiplying the former intermediate correction matrix DD by this intermediate correction matrix BB. In this case, the latter correction matrix EE capable of performing coordinate correction more accurately can be generated.

While the restraining unit 240PR of the coordinate measuring machine 100PR in the above-described embodiments restricts the measurement tip 306PR strictly to one place in the measurement space, the present invention is not limited thereto. For example, the present invention may be configured as in a third embodiment shown in FIG. 19. In the following description, already-described elements will be denoted by the same reference numerals as those in the above-described embodiments, and the description thereof will be omitted.

Figure 19:
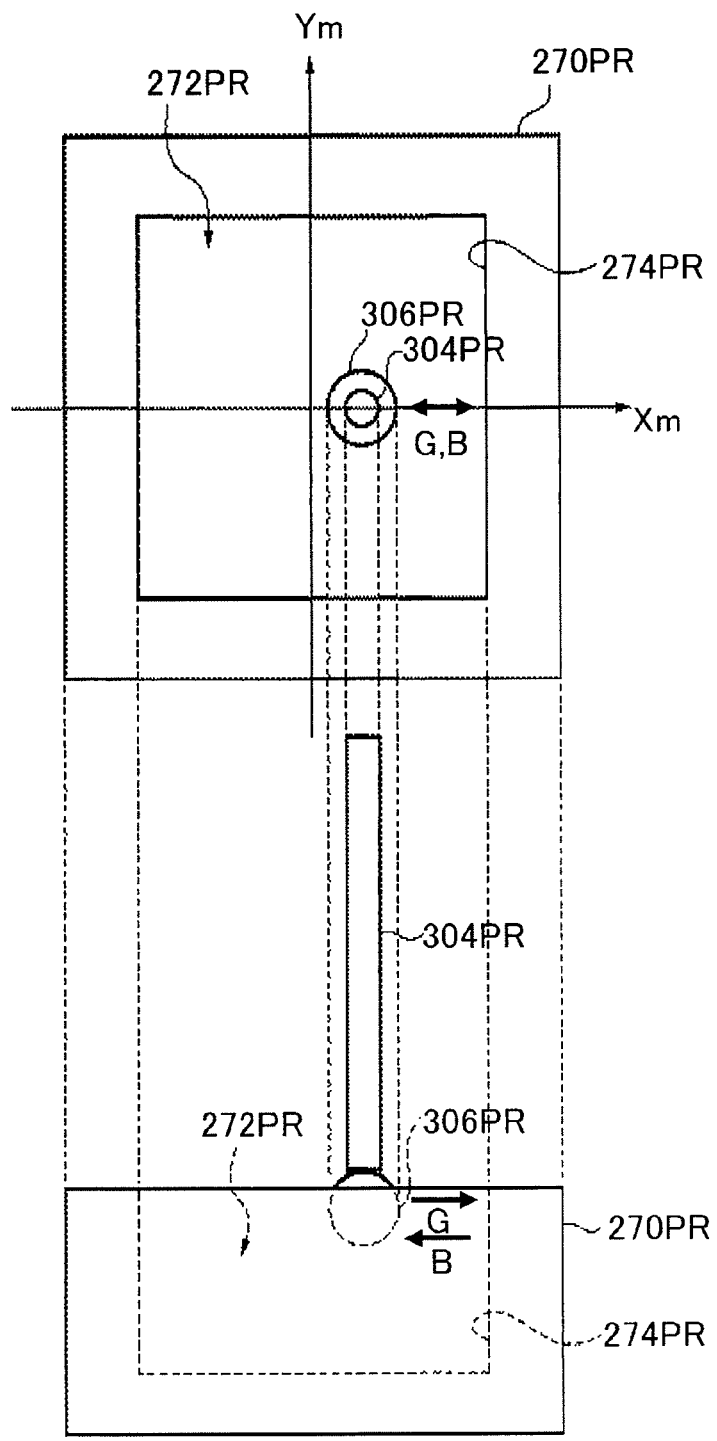
FIG. 19 is a schematic view showing restraining unit and a measurement tip used in a former correction step according to a third embodiment of the present invention.

Unlike the above-described embodiments, restraining unit 270PR in the third embodiment is a member formed in the shape of a container with a cavity in which an inner surface thereof has a polygonal cross-section as shown in FIG. 19. Specifically, the restraining unit 270PR is formed in a rectangular solid shape and provided with a square (may be pentagon or hexagon-shaped) recess 272PR as viewed in a top plan view. An inner surface of the recess 272PR serves as a contact surface 274PR to be in contact with a measurement tip 306PR.

A procedure of coordinate correction with the restraining unit 270PR will now be described below mainly with reference to FIG. 20.

First, the restraining unit 270PR is fixed at a predetermined position on a surface plate 210PR in a measurement space. Thereafter, the measurement tip 306PR is moved by a drive mechanism 220PR to the recess 272PR of the restraining unit 270PR. In order to bring the measurement tip 306PR into contact with the contact surface 274PR from a normal direction (direction G) to the contact surface 274PR, a measuring probe 300PR is moved so that the measurement tip 306PR approaches the contact surface 274PR (Step S100 in FIG. 20). By bringing the measurement tip 306PR into contact with the contact surface 274PR, a translational displacement of the measurement tip 306PR is restrained by the contact surface 274PR(Step S102 in FIG. 20). A position at which a translational displacement of the measurement tip 306PR is restrained and a probe output Ppr is 0 (including when the probe output Ppr represents a value of a noise level) is defined as a reference position Pb (the reference position Pb may be determined by setting a threshold value of the probe output Ppr to discriminate the noise level, or conductive surfaces may be formed on the contact surface 274PR and the measurement tip 306PR to determine the reference position Pb on the basis of the presence or absence of conduction between the contact surface 274RP and the measurement tip 306PR).

Next, while keeping such a restrained state, the measuring probe 300PR is moved in the direction G by the drive mechanism 220PR in accordance with a drive control signal Dpr of a drive mechanism control unit 404PR. When a predetermined displacement amount is achieved, the moving direction of the measuring probe 300PR is inverted in a direction B opposite to the direction G. A plurality of measurement points are provided along the series of movements of the measuring probe 300PR, and a coordinate acquisition unit 406PR acquires a moving amount Mpr and a probe output Ppr at the time of the movement of the measuring probe 300PR from the reference position Pb to each of the measurement points (Step S104 in FIG. 20). In other words, also in the present embodiment, while restraining the measurement tip 306PR by the restraining unit 270PR at the reference position Pb where the probe output Ppr is 0, the coordinate acquisition unit 406PR acquires, the moving amount Mpr and the probe output Ppr at the time of the movement of the measuring probe 300PR from the reference position Pb to each of the measurement points. The rotational displacement of the measurement tip 306PR is not restrained because the measurement tip 306PR is in contact with the contact surface 274PR only at a single point even when the measuring probe 300PR is moved in the direction G or B. At the same time, a position on the contact surface 274PR that is in contact with the measurement tip 306PR at a single point is unchanged when the measuring probe 300PR is moved in the direction G or B.

Figure 20:
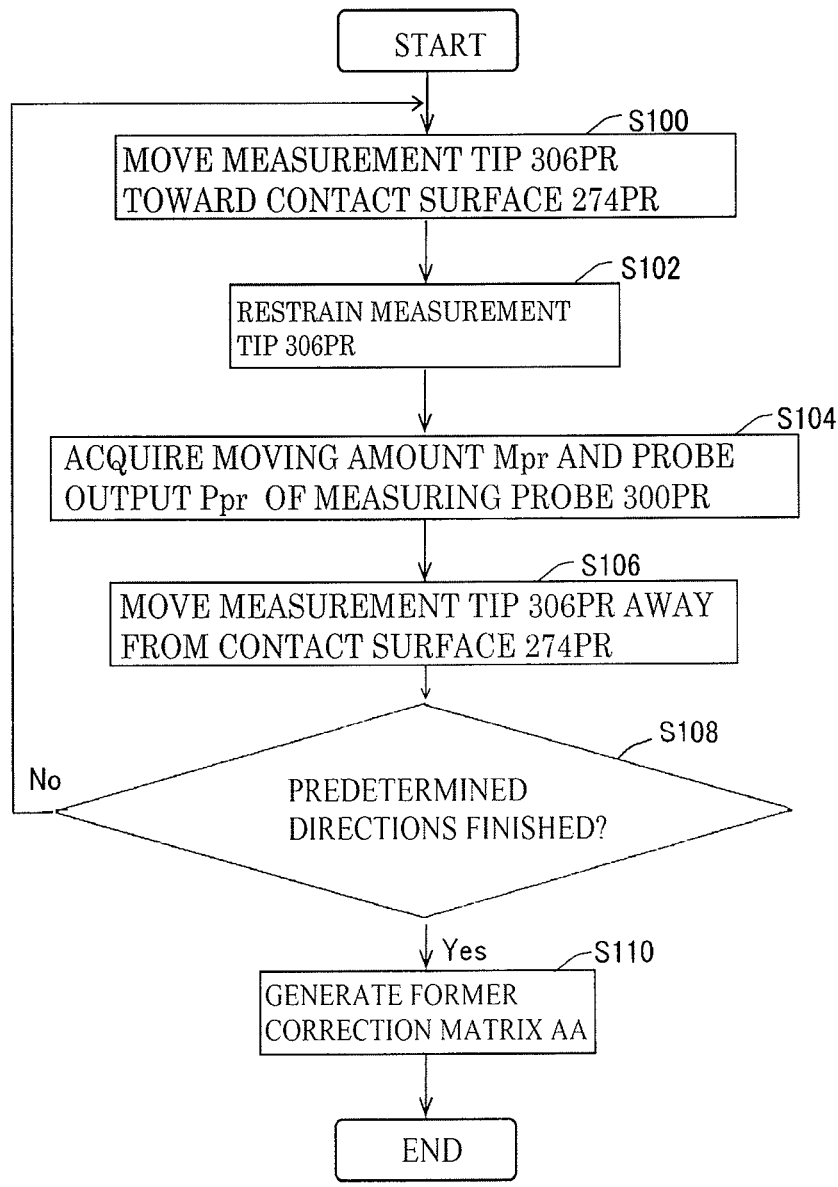
FIG. 20 is a flow chart showing an example of a procedure of the former correction step when the restraining unit of FIG. 19 is used.

Next, the measuring probe 300PR is moved in the direction B to separate the measurement tip 306PR away from the contact surface 274PR (Step S106 in FIG. 20). Whether the measurement tip 306PR is separated away from the contact surface 274PR may be determined in a similar manner as the above-described determination of the reference position Pb. The series of movements of the measuring probe 300PR is performed in an Xm direction, and the moving amount Mpr and the probe output Ppr of the measuring probe 300PR are acquired at each of measurement points in the Xm direction. While the number of the measurement points may be larger than or equal to the sum of the number of linear correction elements $A_{LE}$ and the number of non-linear correction elements $A_{NLE}$ in a former correction matrix AA, the series of movements of the measuring probe 300PR is performed in a predetermined direction other than the Xm direction (Step S108 in FIG. 20). More specifically, by performing and completing Steps from S100 through S106 in FIG. 20 in a plurality of predetermined directions other than the Xm direction (Yes in Step S108 in FIG. 20), the moving amount Mpr and the probe output Ppr of the measuring probe 300PR are acquired at each of n measurement points.

Thereafter, the matrix generation unit 408PR generates the former correction matrix AA with a moving amount Mn and a probe output Pn of the measuring probe 300PR corresponding to the n measurement points (Step S110 in FIG. 20).

As just described, according to the present embodiment, the restraining unit 270PR can have such a simple configuration, no movable parts are provided, and a translational displacement of the measurement tip 306PR can be restrained without restraining a rotational displacement of the measuring probe 300PR in any direction. Note that the present invention is not limited thereto. For example, the restraining unit may be a member formed in the shape of a container with a cavity in which an inner surface thereof has a circular cross-section (instead of a polygonal cross-section). Specifically, the restraining unit has a cylindrical shape and a semispherical recess is provided from the upper surface thereof.

Without being limited to the above configurations, the restraining unit may alternatively be configured with one or more reference spheres, for example. Any restraining unit may be employed as long as the restraining unit enables the coordinate acquisition unit 406PR to acquire the moving amount Mpr and the probe output Ppr of the measuring probe 300PR when the measuring probe 300PR is moved by the drive mechanism 220PR while restraining the measurement tip 306PR by the restraining unit. This is because restraining a translational displacement of the measurement tip 306PR by the restraining unit can clarify the correspondence between the moving amount Mpr and the probe output Ppr of the measuring probe 300PR, whereby the former correction matrix AA can be obtained.

In the above-described embodiment, the normal directions to the surface of the calibration artifact 240 in the pushing drive step are defined as a total of five directions, i.e., three directions perpendicular to one another and two directions among the three directions adding a respective inversed direction. In each of these directions, the pushing drive step is performed in the above-described embodiment. The present invention, however, is not limited thereto. For example, normal directions to the surface of the calibration artifact 240 in the pushing drive step may only be the three directions perpendicular to one another. In such a case, the method for calculating a correction matrix, which is disclosed in Japanese Patent Application Laid-Open No. 2015-158387, may be used to generate an intermediate correction matrix BB. In this case, a procedure up to the generation of the intermediate correction matrix BB (Step S28 in FIG. 10) will be roughly described below with reference to FIG. 10.

First, the measuring probe 300PR detached from the coordinate measuring machine 100PR is set in the drive mechanism 220 of the coordinate measuring machine 100 (Step S20 in FIG. 10).

Next, the calibration artifact 240 is fixed at a predetermined position on the surface plate 210 in the measurement space. Thereafter, the measurement tip 306 is brought into contact with the calibration artifact 240 to obtain the center PC of the calibration artifact 240 (Step S22 in FIG. 10). The center PC is stored in the storage unit 414.

Next, the moving amount M and the probe output P are acquired when a translational displacement of the measurement tip 306 is restrained and the measuring probe 300 is moved by the drive mechanism 220. Specifically, the pushing drive mechanism control unit 404A and the coordinate acquisition unit 406 first control the drive mechanism 220 to perform pushing measurements in a pushing drive step of: bringing the measurement tip 306 into contact with the surface of the calibration artifact 240 at a single point in each of the three directions; pushing the calibration artifact 240 with the measurement tip 306 by a predetermined displacement amount; and then moving the measurement tip 306 in the opposite direction to separate the measurement tip 306 away from the surface (Step S24 in FIG. 10). Note that the three directions perpendicular to one another are each defined as a normal direction to the surface of the calibration artifact 240. In other words, the three directions pass through the obtained center PC of the calibration artifact 240. The specific procedure of the pushing measurement is the same as that in the above-described embodiment, and the description thereof will be therefore omitted. Thereafter, diagonal components $B_{11}$, $B_{22}$, and $B_{33}$ of the linear correction elements $B_{LE}$ in the intermediate correction matrix BB are obtained by the matrix generation unit 408. Here, the diagonal components $B_{11}$, $B_{22}$, and $B_{33}$ are obtained, for example, in a manner as in the application of the least-squares method to Formula (4) shown in the first embodiment.

Next, the scanning drive mechanism control unit 404B and the coordinate acquisition unit 406 control the drive mechanism 220 to perform the scanning measurements in the scanning drive step of moving the measurement tip 306 on the surface of the calibration artifact 240 while pressing the calibration artifact 240 with the measurement tip 306 by a constant deflection amount (Step S26 in FIG. 10). Thereafter, non-diagonal components $B_{12}$, $B_{13}$, $B_{21}$, $B_{23}$, $B_{31}$, and $B_{32}$ of the linear correction elements $B_{LE}$ in the intermediate correction matrix BB are obtained by the matrix generation unit 408. Here, the series of relationships shown in Formulas (8) to (10), which is used when the intermediate correction matrix BB is obtained in the first embodiment, is utilized. The non-diagonal components $B_{12}$, $B_{13}$, $B_{21}$, $B_{23}$, $B_{31}$, and $B_{32}$ are obtained by, for example, applying the non-linear least-squares method to the evaluation function J(E) shown in Formula (10).

Thereafter, the matrix generation unit 408 generates the intermediate correction matrix BB for correcting linear coordinate components of the probe output P on the basis of the obtained diagonal components $B_{11}$, $B_{22}$, and $B_{33}$ and non-diagonal components $B_{12}$, $B_{13}$, $B_{21}$, $B_{23}$, $B_{31}$, and $B_{32}$ (Step S28 in FIG. 10).

In this case, the number of measurement points to which the non-linear least-squares method is applied can be reduced as compared to the above-described embodiment. Thus, an amount of computation can be reduced and the intermediate correction matrix BB can be therefore generated quickly as compared to the above-described embodiment.

The present invention can be applied to a wide variety of coordinate measuring machines for measuring a three-dimensional shape of an object to be measured.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

What is claimed is:

1. A coordinate correction method of a first coordinate measuring machine, the first coordinate measuring machine including: a first measuring probe having a first stylus with a first measurement tip to be brought into contact with an object to be measured, and a probe body for movably supporting the first stylus and providing a first probe output according to a displacement of the first measurement tip; a first drive mechanism for moving the first measuring probe relative to the object to be measured; and a first processing device for computing shape coordinates of the object to be measured on a basis of the first probe output and a first moving amount of the first measuring probe by the first drive mechanism, the coordinate correction method comprising, a former correction process, including:
setting a second measuring probe in a second drive mechanism of a second coordinate measuring machine, the second coordinate measuring machine including the second drive mechanism for relatively moving the second measuring probe including the probe body for movably supporting a second stylus with a second measurement tip, and a second processing device for obtaining, on a basis of a second probe output according to a displacement of the second measurement tip and a second moving amount of the second measuring probe by the second drive mechanism, a former correction matrix for correcting the second probe output with respect to the second moving amount;
restraining a translational displacement of the second measurement tip;
acquiring the second moving amount and the second probe output when the second measuring probe is moved by the second drive mechanism; and
generating the former correction matrix including second linear correction elements and second non-linear correction elements for respectively correcting linear coordinate components and non-linear coordinate components of the second probe output with the second moving amount and the second probe output acquired in each of measurement points in a quantity larger than or equal to a sum of a number of the second linear correction elements and a number of the second non-linear correction elements, and a latter correction process, including:
setting the first measuring probe in the first drive mechanism;
restraining a translational displacement of the first measurement tip;
acquiring the first moving amount and the first probe output when the first measuring probe is moved by the first drive mechanism;
generating an intermediate correction matrix including first linear correction elements for correcting linear coordinate components of the first probe output with the first moving amount and the first probe output; and
correcting the first probe output with a latter correction matrix generated on a basis of the intermediate correction matrix and the former correction matrix.

2. The coordinate correction method according to claim 1, wherein
the former correction process further includes generating a former intermediate correction matrix by multiplying the former correction matrix by an inverse matrix of a former linear correction matrix including only the second linear correction elements, and
the latter correction process further includes generating the latter correction matrix with the former intermediate correction matrix.

3. The coordinate correction method according to claim 2, wherein the correcting the first probe output with the latter correction matrix generated on the basis of the intermediate correction matrix and the former correction matrix includes generating the latter correction matrix by multiplying the former intermediate correction matrix by the intermediate correction matrix.

4. The coordinate correction method according to claim 2, wherein
the former correction process further includes:
changing forms of the second measuring probe corresponding to a number of different forms of the second measuring probe and repeating from the setting the second measuring probe in the second drive mechanism to the generating the former correction matrix; and
generating a correlation between the second linear correction elements or the forms of the second measuring probe and non-linear correction elements of the former intermediate correction matrix on a basis of the plurality of former correction matrixes, and
the correcting the first probe output with the latter correction matrix generated on a basis of the intermediate correction matrix and the former correction matrix includes:
obtaining the non-linear correction elements of the former intermediate correction matrix corresponding to the first linear correction elements, instead of the second linear correction elements, or corresponding to forms of the first measuring probe, instead of the forms of the second measuring probe, with the correlation; and
generating the latter correction matrix with the first linear correction elements and the non-linear correction elements of the former intermediate correction matrix.

5. The coordinate correction method according to claim 4, wherein
the number of the different forms of the second measuring probe is based on a number of different forms of the second stylus, and
the forms of the first measuring probe are based on forms of the first stylus.

6. The coordinate correction method according to claim 5, wherein
the restraining the translational displacement of the second measurement tip includes restraining the translational displacement of the second measurement tip at a reference position where a displacement of the second measurement tip is 0, and not-restraining rotational displacement of a center of the second measurement tip as a center of rotation, and
the acquiring the second moving amount and the second probe output when the second measuring probe is moved by the second drive mechanism, includes acquiring the second moving amount and the second probe output at the time of the movement of the second measuring probe from the reference position to each of the measurement points.

7. The coordinate correction method according to claim 6, wherein
the restraining the translational displacement of the first measurement tip includes bringing the first measurement tip into contact with a calibration artifact, and
the acquiring the first moving amount and the first probe output when the first measuring probe is moved by the first drive mechanism include:
a pushing drive process of bringing, in a normal direction to a surface of the calibration artifact, the first measurement tip into contact with the surface at a single point, pushing the calibration artifact with the first measurement tip by a predetermined displacement amount, and then moving the first measurement tip in an opposite direction to separate the first measurement tip away from the surface; and
a scanning drive process of reciprocating the first measurement tip on the surface of the calibration artifact while pressing the calibration artifact with the first measurement tip by a constant deflection amount.

8. The coordinate correction method according to claim 7, wherein
the normal direction to the surface of the calibration artifact corresponds to a total of five directions including: three directions perpendicular to one another; and two directions among the three directions adding a respective inversed direction, and
the pushing drive process is performed in each of the five directions.

9. The coordinate correction method according to claim 8, wherein
the first measurement tip is pushed by a constant deflection amount on each of three planes perpendicular to one another in the scanning drive process.

10. A first coordinate measuring machine comprising:
a first measuring probe having
a first stylus with a first measurement tip to be brought into contact with an object to be measured, and
a probe body configured to movably support the first stylus and provide a first probe output according to a displacement of the first measurement tip;
a first drive mechanism configured to move the first measuring probe relative to the object to be measured;
a first processing device configured to compute shape coordinates of the object to be measured on a basis of the first probe output and a first moving amount of the first measuring probe by the first drive mechanism; and
a restrainer configured to restrain a translational displacement of the first measurement tip, wherein
the first processing device includes:
a storage configured to store a processed result in a second processing device of a second coordinate measuring machine, the second coordinate measuring machine including a second drive mechanism configured to relatively move a second measuring probe including the probe body configured to movably support a second stylus with a second measurement tip, and the second processing device configured to generate, on a basis of a second probe output according to a displacement of the second measurement tip and a second moving amount of the second measuring probe by the second drive mechanism, the former correction matrix including second linear correction elements and second non-linear correction elements to respectively correct linear coordinate components and non-linear coordinate components of the second probe output with respect to the second moving amount; and
the first processing device
acquires the first moving amount and the first probe output when the first measuring probe is moved by the first drive mechanism;
generates an intermediate correction matrix including first linear correction elements to correct linear coordinate components of the first probe output with the first moving amount and the first probe output; and
corrects the first probe output with a latter correction matrix generated on a basis of the intermediate correction matrix and the former correction matrix.

11. The first coordinate measuring machine according to claim 10, wherein
the storage stores the former correction matrix as the processed result in the second processing device.

12. The first coordinate measuring machine according to claim 10, wherein
the storage stores a former intermediate correction matrix as the processed result in the second processing device,
the second processing device further generates the former intermediate correction matrix by multiplying the former correction matrix by an inverse matrix of a former linear correction matrix including only the second linear correction elements, and
the first processing device further generates the latter correction matrix by multiplying the former intermediate correction matrix by the intermediate correction matrix.

13. The first coordinate measuring machine according to claim 10, wherein
the storage stores a correlation between second linear correction elements or forms of a second measuring probe and non-linear correction elements of a former intermediate correction matrix generated on the basis of a plurality of former correction matrixes corresponding to the number of different forms of the second measuring probe as the processed result in the second processing device,
the second processing device further generates the former intermediate correction matrix by multiplying the former correction matrix by an inverse matrix of a former linear correction matrix including only the second linear correction elements, and
the first processing device further obtains the non-linear correction elements of the former intermediate correction matrix corresponding to the first linear correction elements, instead of the second linear correction elements, or corresponding to forms of the first measuring probe, instead of the forms of the second measuring probe, with the correlation, so as to generate the latter correction matrix with the first linear correction elements and the non-linear correction elements of the former intermediate correction matrix.

* * * * *